(12) United States Patent
Zhang et al.

(10) Patent No.: US 10,645,382 B2
(45) Date of Patent: May 5, 2020

(54) VIDEO PROCESSING METHOD, ENCODING DEVICE, AND DECODING DEVICE

(71) Applicant: HUAWEI TECHNOLOGIES CO., LTD., Shenzhen, Guangdong (CN)

(72) Inventors: Xiang Zhang, Beijing (CN); Siwei Ma, Beijing (CN); Zhuoyi Lv, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 275 days.

(21) Appl. No.: 15/486,475

(22) Filed: Apr. 13, 2017

(65) Prior Publication Data

US 2017/0223351 A1    Aug. 3, 2017

Related U.S. Application Data

(63) Continuation of application No. PCT/CN2015/077816, filed on Apr. 29, 2015.

(30) Foreign Application Priority Data

Oct. 17, 2014    (CN) .......................... 2014 1 0553229

(51) Int. Cl.
*H04N 19/115*    (2014.01)
*H04N 19/176*    (2014.01)
(Continued)

(52) U.S. Cl.
CPC ......... *H04N 19/115* (2014.11); *H04N 19/119* (2014.11); *H04N 19/124* (2014.11);
(Continued)

(58) Field of Classification Search
CPC .... H04N 19/115; H04N 19/119; H04N 19/46; H04N 19/176; H04N 19/61; H04N 19/19
See application file for complete search history.

(56) References Cited

U.S. PATENT DOCUMENTS 8,094,716 B1    1/2012    Chen et al.
8,175,150 B1    5/2012    Zhang et al.
(Continued)

FOREIGN PATENT DOCUMENTS

CN    101960466 A    1/2011
CN    102780884 A    11/2012
(Continued)

OTHER PUBLICATIONS

International Search Report dated for Aug. 5, 2015 in corresponding International Patent Application No. PCT/CN2015/077816.
(Continued)

*Primary Examiner* — Nam D Pham
(74) *Attorney, Agent, or Firm* — Conley Rose, P.C.

(57) ABSTRACT

A video processing method includes: receiving video data, where the video data is divided into multiple frames; calculating a Lagrange multiplier of a current predict unit in a current coding unit, where the current predict unit is a segment of video signal within the current coding unit, the current coding unit is located in a current frame, and the current frame is one of the multiple frames; performing, by using the Lagrange multiplier of the current predict unit, encoding processing on the current predict unit according to a rate-distortion optimization algorithm to obtain an encoding result of the current predict unit; and sending the encoding result of the current predict unit to a decoder side. An encoding device and a decoding device respectively corresponding to the video processing method are also been provided.

27 Claims, 6 Drawing Sheets

(51) Int. Cl.
*H04N 19/46* (2014.01)
*H04N 19/119* (2014.01)
*H04N 19/124* (2014.01)
*H04N 19/147* (2014.01)
*H04N 19/182* (2014.01)
*H04N 19/184* (2014.01)
*H04N 19/19* (2014.01)
*H04N 19/61* (2014.01)

(52) U.S. Cl.
CPC ........ *H04N 19/147* (2014.11); *H04N 19/176* (2014.11); *H04N 19/182* (2014.11); *H04N 19/184* (2014.11); *H04N 19/19* (2014.11); *H04N 19/46* (2014.11); *H04N 19/61* (2014.11)

(56) References Cited

U.S. PATENT DOCUMENTS

| | | | |
|---|---|---|---|
| 8,355,436 B2 | 1/2013 | Haskell et al. | |
| 2009/0067495 A1 | 3/2009 | Au et al. | |
| 2011/0142124 A1 | 6/2011 | Huang et al. | |
| 2014/0140396 A1 | 5/2014 | Wang et al. | |
| 2015/0358629 A1* | 12/2015 | Choi | H04N 19/70 375/240.02 |
| 2015/0373326 A1* | 12/2015 | Hebel | H04N 19/147 375/240.03 |

FOREIGN PATENT DOCUMENTS

| | | |
|---|---|---|
| CN | 103188496 A | 7/2013 |
| CN | 103607590 A | 2/2014 |
| CN | 103634600 A | 3/2014 |
| CN | 103918271 A | 7/2014 |
| CN | 103929652 A | 7/2014 |
| CN | 103997646 A | 8/2014 |
| CN | 104052994 A | 9/2014 |
| CN | 104301724 A | 1/2015 |
| JP | 2006-157214 | 6/2006 |
| WO | 2014/120368 A1 | 8/2014 |

OTHER PUBLICATIONS

Chinese Office Action dated Jan. 3, 2017 in corresponding Chinese Patent Application No. 201410553229.8.
Chinese Office Action dated Jun. 30, 2017 in corresponding Chinese Patent Application No. 201410553229.8.
Chinese Search Report dated Dec. 23, 2016 in corresponding Chinese Patent Application No. 2014105532298.
Chinese Search Report dated Jun. 18, 2017 in corresponding Chinese Patent Application No. 2014105532298.
Chuohao Yeo et al. "On Rate Distortion Optimization Using SSIM" IEEE Transactions on Circuits and Systems for Video Technology vol. 23 No. 7, Jul. 2013.
"Series H: Audiovisual and Multimedia Systems Infrastructure of audiovisual services —Coding of moving video; Advanced video coding for generic audiovisual services" Telecommunication Standardization Sector of ITU, ITU-T, H.264, Feb., 2014.
International Search Report dated Aug. 5, 2015 in corresponding International Application No. PCT/CN2015/077816.

* cited by examiner

100

```
┌─────────────────────────────────────────────────────┐
│ Receive video data, where the video data is divided │
│ into multiple frames, each of the multiple frames   │
│ is divided into multiple code blocks, and each code │──S110
│ block is divided into at least two prediction       │
│ blocks                                              │
└─────────────────────────────────────────────────────┘
                          │
┌─────────────────────────────────────────────────────┐
│ Calculate a Lagrange multiplier of a current        │
│ prediction block in a current code block, where the │
│ current prediction block is a segment of video      │──S120
│ signal within the current code block, the current   │
│ code block is located in a current frame, and the   │
│ current frame is one of the multiple frames         │
└─────────────────────────────────────────────────────┘
                          │
┌─────────────────────────────────────────────────────┐
│ Perform, by using the Lagrange multiplier of the    │
│ current prediction block, encoding processing on    │
│ the current prediction block according to a rate-   │──S130
│ distortion optimization algorithm to obtain an      │
│ encoding result of the current prediction block     │
└─────────────────────────────────────────────────────┘
                          │
┌─────────────────────────────────────────────────────┐
│ Send the encoding result of the current prediction  │──S140
│ block to a decoder side                             │
└─────────────────────────────────────────────────────┘
```

FIG. 1

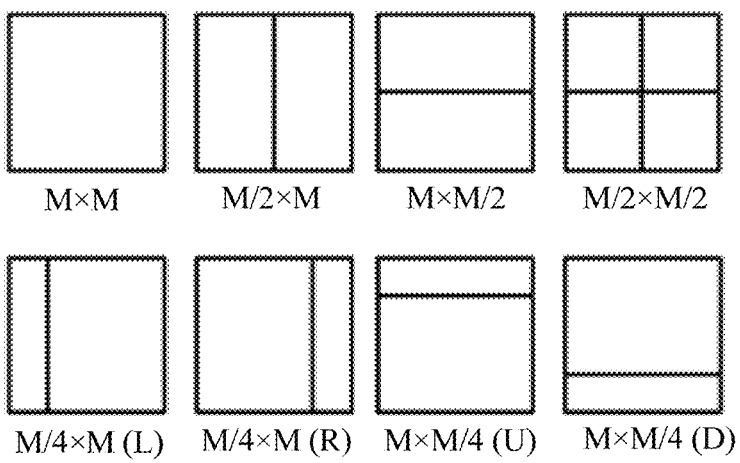

┌─────────────────────────────────────────────────┐
│ Receive encoding information in a video bitstream sent by an
│ encoder side, where the encoding information includes a size
│ of a current code block, a method for dividing the current code
│ block, and parameter information of a current prediction block;   S210
│ and the parameter information of the current prediction block
│ refers to motion vector information of the current prediction
│ block during inter-frame prediction, or the parameter
│ information of the current prediction block refers to
│ prediction direction information of the current
│ prediction block during intra-frame prediction
└─────────────────────────────────────────────────┘

┌─────────────────────────────────────────────────┐
│ Divide, according to the method for dividing the current code    S220
│ block, the size of the current code block to obtain a size of the
│ current prediction block
└─────────────────────────────────────────────────┘

┌─────────────────────────────────────────────────┐
│ Determine a prediction signal of the current prediction block
│ according to the size of the current prediction block and the
│ motion vector information of the current prediction block
│ during the inter-frame prediction and according to an inter-
│ frame prediction mechanism; or determine a prediction signal    S230
│ of the current prediction block according to the size of the
│ current prediction block and the prediction direction
│ information of the current prediction block during the
│ intra-frame prediction and according to an
│ intra-frame prediction mechanism
└─────────────────────────────────────────────────┘

┌─────────────────────────────────────────────────┐
│ Perform, after a residual operation based on the prediction      S240
│ signal of the current prediction block, decoding processing on
│ the current prediction block to obtain a decoding result of the
│ current prediction block
└─────────────────────────────────────────────────┘

FIG. 5

VIDEO PROCESSING METHOD, ENCODING DEVICE, AND DECODING DEVICE

CROSS-REFERENCE TO RELATED APPLICATIONS

This application is a continuation of International Application No. PCT/CN2015/077816, filed on Apr. 29, 2015, which claims priority to Chinese Patent Application No. 201410553229.8 filed on Oct. 17, 2014, The disclosures of the aforementioned applications are hereby incorporated by reference in their entireties.

TECHNICAL FIELD

The present invention relates to the communications field, and in particular, to a video processing method, an encoding device, and a decoding device.

BACKGROUND

With development of information technologies, a video signal, because of advantages such as intuitiveness and high-efficiency, becomes the most important manner of obtaining information in people's daily life. Because a video signal includes a large amount of data, and needs to occupy a large amount of transmission bandwidth and storage space, to efficiently transmit and store the video signal, compression coding needs to be performed on the video signal. In addition, as video services rapidly develop, such as high definition television, online meeting, IPTV, or 3D television, and people have a higher requirement for video quality, a video compression technology has increasingly become an indispensable key technology in the video application field.

Video coding uses the information theory provided by C. E. Shannon as a theoretical basis, for the purpose of effectively removing redundancy information between video signals and maximizing compression efficiency. In a research process of a video coding technology, new algorithms and theories appear one after another. For example, redundancy information between video signals can be effectively removed and processed by using an encoding method such as DPCM, transform coding, or Huffman coding. Establishment of a quantization theory and a rate-distortion theory can guide an encoding process more efficiently. In addition, technologies such as motion estimation, deblocking filtering, and adaptive loop filtering are generated based on a feature of a video itself.

It is well-known that an information processing capability of a human visual system is far stronger than that of a current video processing system. In addition, because a human eye is an ultimate recipient, it is particularly important to analyze a video distortion feature based on a feature of a human-eye visual system, and design a high-efficiency video coding method based on a video feature. Researches show that neither a sum of absolute differences (SAD) nor a sum of squared differences (SSD) in use for a long time in a rate-distortion optimization method of video coding can well reflect subjective perception of a human eye to an image. In recent years, the research community successively puts forward distortion measurement functions including a JND and an SSIM, and applies the functions to video coding.

The prior art provides an SSIM-based rate-distortion optimization encoding method implemented on H.264/AVC. As shown in the formula (1), a reciprocal of SSIM is first used as a function to measure subjective distortion, and is applied to a method for adjusting a Lagrange multiplier of rate-distortion optimization. $\delta_x$ is a variance of a current macroblock, MSE is a mean square error of a current coding unit, and $c^2$ is a constant.

$$\frac{1}{SSIM} \approx 1 + \frac{MSE}{2\delta_x^2 + c_2} \qquad (1)$$

In the prior art, an SSIM-based subjective distortion evaluation function is used to improve a rate-distortion optimization algorithm of the current coding unit in mode selection, so as to compress an image and improve subjective quality. However, a Lagrange multiplier of a coding unit is determined according to a local feature of the coding unit. As a result, when motion estimation is performed for a predict unit in the coding unit by using the Lagrange multiplier of the coding unit, prediction is inaccurate, and a residual of the predict unit is relatively large. Further, encoding the residual consumes a relatively large bit rate, resulting in relatively low video coding efficiency.

SUMMARY

The present invention provides a video processing method, an encoding device, and a decoding device, so that encoding compression efficiency can be improved.

According to a first aspect, a video processing method is provided, where the method includes: receiving video data, where the video data is divided into multiple frames, each of the multiple frames is divided into multiple coding units, and each coding unit is divided into at least two predict units; calculating a Lagrange multiplier LambdaP$_{new}$ of a current predict unit in a current coding unit, where the current predict unit is a segment of video signal within the current coding unit, the current coding unit is located in a current frame, and the current frame is one of the multiple frames; performing, by using the Lagrange multiplier LambdaP$_{new}$ of the current predict unit, encoding processing on the current predict unit according to a rate-distortion optimization algorithm to obtain an encoding result of the current predict unit; and sending the encoding result of the current predict unit to a decoder side.

With reference to the first aspect, in a first possible implementation manner of the first aspect, the calculating a Lagrange multiplier LambdaP$_{new}$ of a current predict unit in a current coding unit includes: determining the current predict unit; calculating energy E$_{global}$ of the current frame and first energy Ep$_{local}$ of the current predict unit; determining a first scale factor Fp of the current predict unit according to a ratio of the first energy Ep$_{local}$ of the current predict unit to the energy E$_{global}$ of the current frame, where the first scale factor Fp ranges from 0 to 2; and performing, by using the first scale factor Fp, scaling processing on a Lagrange multiplier Lambda to obtain the Lagrange multiplier LambdaP$_{new}$ of the current predict unit.

With reference to the first possible implementation manner of the first aspect, in a second possible implementation manner of the first aspect, the calculating energy E$_{global}$ of the current frame and first energy Ep$_{local}$ of the current predict unit includes: determining a minimum unit of k*k pixels, where the current frame includes N minimum units, and the current predict unit includes L minimum units, where k, N and L are all integers greater than 1, and N>L; calculating a first variance V$_i^f$ of an $i^{th}$ minimum unit of the current frame f according to the following formula:

$$V_i^f = \sum_{j=1}^{k^2} \left(x_{i,j}^f - \overline{x}_i^f\right)^2;$$

where i is a positive integer less than or equal to N, $x_{i,j}^f$ is a $j^{th}$ pixel value of the $i^{th}$ minimum unit of the current frame f, and $\overline{x}_i^f$ indicates an average value of pixel values of the $i^{th}$ minimum unit of the current frame f, calculating the energy $E_{global}$ of the current frame according to the following formula:

$$E_{global} = \frac{1}{N} \sum_{i=1}^{N} \sqrt{\frac{2V_i^f}{k^2-1} + C};$$

and calculating the first energy $Ep_{local}$ of the current predict unit according to the $$Ep_{local} = \frac{1}{L} \sum_{i=1}^{L} \sqrt{\frac{2V_i^f}{k^2-1} + C};$$

where $C=(\alpha*255)^2$, $\alpha \in (0,1)$.

With reference to the first or the second possible implementation manner of the first aspect, in a third possible implementation manner of the first aspect, the determining the current predict unit includes: calculating a Lagrange multiplier of each candidate predict unit in Y candidate predict units, where Y is an integer greater than or equal to 2; determining, by using a Lagrange multiplier of an $x^{th}$ candidate predict unit in the Y candidate predict units, parameter information of the $x^{th}$ candidate predict unit according to the rate-distortion optimization algorithm, where x needs to be each integer in [1, Y], parameter information of the current predict unit refers to motion vector information of the $x^{th}$ candidate predict unit during inter-frame prediction, or parameter information of the current predict unit refers to prediction direction information of the $x^{th}$ candidate predict unit during intra-frame prediction; determining, by using the rate-distortion optimization algorithm, a candidate predict unit from the Y candidate predict units as a target candidate predict unit according to motion vector information of each candidate predict unit in the Y candidate predict units during the inter-frame prediction or according to prediction direction information of each candidate predict unit in the Y candidate predict units during the intra-frame prediction; and dividing, by using the target candidate predict unit, the current coding unit to obtain the current predict unit.

With reference to the third possible implementation manner of the first aspect, in a fourth possible implementation manner of the first aspect, the performing, by using the Lagrange multiplier LambdaP$_{new}$ of the current predict unit, encoding processing on the current predict unit according to a rate-distortion optimization algorithm to obtain an encoding result of the current predict unit includes: determining a prediction signal of the current predict unit according to a size of the current predict unit and motion vector information of the current predict unit during the inter-frame prediction and according to an inter-frame prediction mechanism; or determining a prediction signal of the current predict unit according to a size of the current predict unit and prediction direction information of the current predict unit during the intra-frame prediction and according to an intra-frame prediction mechanism; and performing, after a residual operation based on the prediction signal of the current predict unit, entropy encoding on the current predict unit to obtain the encoding result of the current predict unit.

With reference to the fourth possible implementation manner of the first aspect, in a fifth possible implementation manner of the first aspect, the performing, after a residual operation based on the prediction signal of the current predict unit, entropy encoding on the current predict unit to obtain the encoding result of the current predict unit includes: obtaining a residual of the current predict unit according to a received difference between a video signal of the current predict unit and the prediction signal of the current predict unit, where the video signal of the current predict unit is located in the video data; performing discrete cosine transform DCT processing on the residual of the current predict unit to obtain a DCT transform coefficient of the current predict unit; performing quantization processing on the DCT transform coefficient according to a quantization parameter Qp$_{new}$ of the current predict unit; and performing entropy encoding processing on a size of the current coding unit, a manner of dividing the current coding unit by using the target candidate predict unit, the parameter information of the current predict unit, and the DCT transform coefficient that is obtained after the quantization processing, to obtain the encoding result of the current predict unit.

With reference to the fifth possible implementation manner of the first aspect, in a sixth possible implementation manner of the first aspect, the performing, after a residual operation based on the prediction signal of the current predict unit, entropy encoding on the current predict unit to obtain the encoding result of the current predict unit includes: obtaining a residual of the current predict unit according to a received difference between a video signal of the current predict unit and the prediction signal of the current predict unit, where the video signal of the current predict unit is located in the video data; performing discrete cosine transform DCT processing on the residual of the current predict unit to obtain a DCT transform coefficient of the current predict unit; performing quantization processing on the DCT transform coefficient according to a quantization parameter Qp$_{new}$ of the current predict unit; and performing entropy encoding processing on a size of the current coding unit, a manner of dividing the current coding unit by using the target candidate predict unit, the parameter information of the current predict unit, and the DCT transform coefficient that is obtained after the quantization processing, to obtain the encoding result of the current predict unit.

With reference to the sixth possible implementation manner of the first aspect, in a seventh possible implementation manner of the first aspect, the determining second energy Ep'$_{local}$ of the current predict unit according to the prediction signal of the current predict unit includes: calculating a second variance $V''_i{}^f$ of an $i^{th}$ minimum unit of the current predict unit of the current frame f according to the following formula:

$$V_i''^f = \sum_{j=1}^{k^2} \left(x_{i,j}''^f - \overline{x}''^f_i\right)^2;$$

where $x''_{i,j}{}^f$ is a $j^{th}$ pixel value of the $i^{th}$ minimum unit of the current predict unit of the current frame f, and $\overline{x''}_i{}^f$ indicates an average value of pixel values of the $i^{th}$ minimum unit of the current predict unit of the current frame f, and determining the second energy $Ep'_{local}$ of the current predict unit according to the following formula:

$$Ep'_{local} = \frac{1}{L} \sum_{i=1}^{L} \sqrt{\frac{2V''^f_i}{k^2-1} + C};$$

where $C=(\alpha*255)^2$, $\alpha \in (0,1)$.

With reference to the sixth or the seventh possible implementation manner of the first aspect, in an eighth possible implementation manner of the first aspect, the determining, according to a reconstructed signal of an encoded reconstructed frame, energy $E'_{global}$ of the reconstructed frame includes: the reconstructed frame includes N' minimum units, where N' is a positive integer greater than 1; calculating a variance $V'^{f'}_i$ of an $i^{th}$ minimum unit of the reconstructed frame f' according to the following formula:

$$V'^{f'}_i = \sum_{j=1}^{k^2} \left( x'^{f'}_{i,j} - \overline{x'}^{f'}_i \right)^2;$$

where $x'^{f'}_{i,j}$ is a $j^{th}$ pixel value of the $i^{th}$ minimum unit of the reconstructed frame f', and $\overline{x'}^{f'}_i$ indicates an average value of pixel values of the $i^{th}$ minimum unit of the reconstructed frame f', and determining the energy $E'_{global}$ of the reconstructed frame according to the following formula:

$$E'_{global} = \frac{1}{N'} \sum_{i=1}^{N'} \sqrt{\frac{2V'^{f'}_i}{k^2-1} + C};$$

where $C=(\alpha*255)^2$, $\alpha \in (0,1)$.

According to a second aspect, a video processing method is provided, where the method includes: receiving encoding information in a video bitstream sent by an encoder side, where the encoding information includes a size of a current coding unit, a method for dividing the current coding unit, and parameter information of a current predict unit; and the parameter information of the current predict unit refers to motion vector information of the current predict unit during inter-frame prediction, or the parameter information of the current predict unit refers to prediction direction information of the current predict unit during intra-frame prediction; dividing, according to the method for dividing the current coding unit, the size of the current coding unit to obtain a size of the current predict unit; determining a prediction signal of the current predict unit according to the size of the current predict unit and the motion vector information of the current predict unit during the inter-frame prediction and according to an inter-frame prediction mechanism; or determining a prediction signal of the current predict unit according to the size of the current predict unit and the prediction direction information of the current predict unit during the intra-frame prediction and according to an intra-frame prediction mechanism; and performing, after a residual operation based on the prediction signal of the current predict unit, decoding processing on the current predict unit to obtain a decoding result of the current predict unit.

With reference to the second aspect, in a first possible implementation manner of the second aspect, the performing, after a residual operation based on the prediction signal of the current predict unit, decoding processing on the current predict unit to obtain a decoding result of the current predict unit includes: determining a quantization parameter $Qp_{new}$ of the current predict unit according to the prediction signal of the current predict unit; performing, according to the quantization parameter $Qp_{new}$ of the current predict unit, dequantization processing on a discrete cosine transform DCT transform coefficient obtained after quantization processing, to obtain a DCT transform coefficient of the current predict unit, where the encoding information further includes the DCT transform coefficient obtained after the quantization processing; performing inverse discrete cosine transform IDCT processing on the DCT transform coefficient of the current predict unit to obtain a residual of the current predict unit; and determining the decoding result based on a sum of the prediction signal of the current predict unit and the residual of the current predict unit.

With reference to the first possible implementation manner of the second aspect, in a second possible implementation manner of the second aspect, the determining a quantization parameter $Qp_{new}$ of the current predict unit according to the prediction signal of the current predict unit includes: determining energy $Ep'_{local}$ of the current predict unit according to the prediction signal of the current predict unit; determining, according to a reconstructed signal of a decoded reconstructed frame, energy $E'_{global}$ of the reconstructed frame; determining a scale factor $Fp''$ of the current predict unit according to a ratio of the energy $Ep'_{local}$ of the current predict unit to the energy $E'_{global}$ of the reconstructed frame; and determining the quantization parameter $Qp_{new}$ of the current predict unit according to the following formula:

$Qp_{new} = Qp + 6 \times \log_2 Fp''$; where $Qp_{new}$ is the scale factor of the current predict unit, and $Qp$ is an original quantization parameter.

With reference to the second possible implementation manner of the second aspect, in a third possible implementation manner of the second aspect, the determining energy $Ep'_{local}$ of the current predict unit according to the prediction signal of the current predict unit includes: determining a minimum unit of k*k pixels, where the current predict unit includes L minimum units, and both k and L are positive integers greater than 1; calculating a variance $V''^f_i$ of an $i^{th}$ minimum unit of the current predict unit of the current frame f according to the following formula:

$$V''^f_i = \sum_{j=1}^{k^2} \left( x''^f_{i,j} - \overline{x''}^f_i \right)^2;$$

where $x''_{i,j}{}^f$ is a $j^{th}$ pixel value of the $i^{th}$ minimum unit of the current predict unit of the current frame f, and $\overline{x''}_i{}^f$ indicates an average value of pixel values of the $i^{th}$ minimum unit of the current predict unit of the current frame f, and determining the energy Ep'$_{local}$ of the current predict unit according to the following formula:

$$Ep'_{local} = \frac{1}{L} \sum_{i=1}^{L} \sqrt{\frac{2V_i''^f}{k^2-1} + C};$$

where $C=(\alpha*255)^2, \alpha \in (0,1)$.

With reference to the second or the third possible implementation manner of the second aspect, in a fourth possible implementation manner of the second aspect, the determining, according to a reconstructed signal of a decoded reconstructed frame, energy E'$_{global}$ of the reconstructed frame includes: the reconstructed frame includes N' minimum units, where N' is a positive integer greater than 1; calculating a variance V'$_i^{f'}$ of an i$^{th}$ minimum unit of the reconstructed frame f' according to the following formula:

$$V_i'^{f'} = \sum_{j=1}^{k^2} \left(x_{i,j}'^{f'} - \overline{x_i}^{f'}\right)^2;$$

where x'$_{i,j}^{f'}$ is a j$^{th}$ pixel value of the i$^{th}$ minimum unit of the reconstructed frame f', and $\overline{x_i}^{f'}$ indicates an average value of pixel values of the i$^{th}$ minimum unit of the reconstructed frame f'; and determining the energy E'$_{global}$ of the reconstructed frame according to the following formula:

$$E'_{global} = \frac{1}{N'} \sum_{i=1}^{N'} \sqrt{\frac{2V_i'^{f'}}{k^2-1} + C};$$

where $C=(\alpha*255)^2, \alpha \in (0,1)$.

According to a third aspect, an encoding device is provided, where the encoding device includes: an obtaining module, configured to receive video data, where the video data is divided into multiple frames, each of the multiple frames is divided into multiple coding units, and each coding unit is divided into at least two predict units; a calculation module, configured to calculate a Lagrange multiplier LambdaP$_{new}$ of a current predict unit in a current coding unit, where the current predict unit is a segment of video signal within the current coding unit, the current coding unit is located in a current frame, and the current frame is one of the multiple frames; a processing module, configured to perform, by using the Lagrange multiplier LambdaP$_{new}$ of the current predict unit, encoding processing on the current predict unit according to a rate-distortion optimization algorithm to obtain an encoding result of the current predict unit; and a sending module, configured to send the encoding result of the current predict unit to a decoder side.

With reference to the third aspect, in a first possible implementation manner of the third aspect, the calculation module is specifically configured to: determine the current predict unit; calculate energy E$_{global}$ of the current frame and first energy Ep$_{local}$ of the current predict unit; determine a first scale factor Fp of the current predict unit according to a ratio of the first energy Ep$_{local}$ of the current predict unit to the energy E$_{global}$ of the current frame, where the first scale factor Fp ranges from 0 to 2; and perform, by using the first scale factor Fp, scaling processing on a Lagrange multiplier Lambda to obtain the Lagrange multiplier LambdaP$_{new}$ of the current predict unit.

With reference to the third aspect or the first possible implementation manner of the third aspect, in a second possible implementation manner of the third aspect, the calculation module is specifically configured to: determine a minimum unit of k*k pixels, where the current frame includes N minimum units, and the current predict unit includes L minimum units, where k, N and L are all integers greater than 1, and N>L; calculate a first variance V$_i^f$ of an i$^{th}$ minimum unit of the current frame f according to the following formula:

$$V_i^f = \sum_{j=1}^{k^2} \left(x_{i,j}^f - \overline{x_i}^f\right)^2;$$

where i is a positive integer less than or equal to N, x$_{i,j}^f$ is a j$^{th}$ pixel value of the i$^{th}$ minimum unit of the current frame f, and $\overline{x_i}^f$ indicates an average value of pixel values of the i$^{th}$ minimum unit of the current frame f, calculate the energy E$_{global}$ of the current frame according to the following formula:

$$E_{global} = \frac{1}{N} \sum_{i=1}^{N} \sqrt{\frac{2V_i^f}{k^2-1} + C};$$

where calculate the first energy Ep$_{local}$ of the current predict unit according to the following formula:

$$Ep_{local} = \frac{1}{L} \sum_{i=1}^{L} \sqrt{\frac{2V_i^f}{k^2-1} + C};$$

where $C=(\alpha*255)^2, \alpha \in (0,1)$.

With reference to any one of the third aspect, or the first or the second possible implementation manners of the third aspect, in a third possible implementation manner of the third aspect, the calculation module is specifically configured to: calculate a Lagrange multiplier of each candidate predict unit in Y candidate predict units, where Y is an integer greater than or equal to 2; determine, by using a Lagrange multiplier of an x$^{th}$ candidate predict unit in the Y candidate predict units, parameter information of the x$^{th}$ candidate predict unit according to the rate-distortion optimization algorithm, where x needs to be each integer in [1, Y], parameter information of the current predict unit refers to motion vector information of the x$^{th}$ candidate predict unit during inter-frame prediction, or parameter information of the current predict unit refers to prediction direction information of the x$^{th}$ candidate predict unit during intra-frame prediction; determine, by using the rate-distortion optimization algorithm, a candidate predict unit from the Y candidate predict units as a target candidate predict unit according to motion vector information of each candidate predict unit in the Y candidate predict units during the inter-frame prediction or according to prediction direction information of each candidate predict unit in the Y candidate predict units during the intra-frame prediction; and divide, by using the target candidate predict unit, the current coding unit to obtain the current predict unit.

With reference to the third possible implementation manner of the third aspect, in a fourth possible implementation manner of the third aspect, the processing module is specifically configured to: determine a prediction signal of the current predict unit according to a size of the current predict unit and motion vector information of the current predict unit during the inter-frame prediction and according to an inter-frame prediction mechanism; or determine a prediction signal of the current predict unit according to a size of the current predict unit and prediction direction information of the current predict unit during the intra-frame prediction and according to an intra-frame prediction mechanism; and perform, after a residual operation based on the prediction signal of the current predict unit, entropy encoding on the current predict unit to obtain the encoding result of the current predict unit.

With reference to the fourth possible implementation manner of the third aspect, in a fifth possible implementation manner of the third aspect, the processing module is specifically configured to: obtain a residual of the current predict unit according to a received difference between a video signal of the current predict unit and the prediction signal of the current predict unit, where the video signal of the current predict unit is located in the video data; perform discrete cosine transform DCT processing on the residual of the current predict unit to obtain a DCT transform coefficient of the current predict unit; perform quantization processing on the DCT transform coefficient according to a quantization parameter $Qp_{new}$ of the current predict unit; and perform entropy encoding processing on a size of the current coding unit, a manner of dividing the current coding unit by using the target candidate predict unit, the parameter information of the current predict unit, and the DCT transform coefficient that is obtained after the quantization processing, to obtain the encoding result of the current predict unit.

With reference to the fourth or the fifth possible implementation manner of the third aspect, in a sixth possible implementation manner of the third aspect, the processing module is specifically configured to: determine second energy $Ep'_{local}$ of the current predict unit according to the prediction signal of the current predict unit; determine, according to a reconstructed signal of an encoded reconstructed frame, energy $E'_{global}$ of the reconstructed frame; determine a second scale factor $Fp''$ of the current predict unit according to a ratio of the second energy $E'_{global}$ of the current predict unit to the energy $E'_{global}$ of the reconstructed frame; determine the quantization parameter $Qp_{new}$ according to the following formula:

$Qp_{new} = Qp + 6 \times \log_2 Fp''$; where $Fp''$ is the second scale factor, and Qp is an original quantization parameter; and perform the quantization processing on the DCT transform coefficient according to the quantization parameter.

With reference to the sixth possible implementation manner of the third aspect, in a seventh possible implementation manner of the third aspect, the processing module is specifically configured to: calculate a second variance $V''^f_i$ of an $i^{th}$ minimum unit of the current predict unit of the current frame f according to the following formula:

$$V_i''^f = \sum_{j=1}^{k^2} \left( x_{i,j}''^f - \overline{x}_i''^f \right)^2;$$

where $x''^f_{i,j}$ is a $j^{th}$ pixel value of the $i^{th}$ minimum unit of the current predict unit of the current frame f, and $\overline{x}_i''^f$ indicates an average value of pixel values of the $i^{th}$ minimum unit of the current predict unit of the current frame f, and determine the second energy $Ep'_{local}$ of the current predict unit according to the following formula:

$$Ep'_{local} = \frac{1}{L} \sum_{i=1}^{L} \sqrt{\frac{2V_i''^f}{k^2 - 1} + C};$$

where $C = (\alpha * 255)^2$, $\alpha \in (0,1)$.

With reference to the sixth or the seventh possible implementation manner of the third aspect, in an eighth possible implementation manner of the third aspect, the processing module is specifically configured to: the reconstructed frame includes N' minimum units, where N' is a positive integer greater than 1; calculate a variance $V'^{f'}_i$ of an $i^{th}$ minimum unit of the reconstructed frame f' according to the following formula:

$$V_i'^{f'} = \sum_{j=1}^{k^2} \left( x_{i,j}'^{f'} - \overline{x}_i'^{f'} \right)^2;$$

where $x'^{f'}_{i,j}$ is a pixel value of the $i^{th}$ minimum unit of the reconstructed frame f', and $\overline{x}_i'^{f'}$ indicates an average value of pixel values of the $i^{th}$ minimum unit of the reconstructed frame f'; and determine the energy $E'_{global}$ of the reconstructed frame according to the following formula:

$$E'_{global} = \frac{1}{N'} \sum_{i=1}^{N'} \sqrt{\frac{2V_i'^{f'}}{k^2 - 1} + C};$$

where $C = (\alpha * 255)^2$, $\alpha \in (0,1)$.

According to a fourth aspect, a decoding device is provided, where the decoding device includes: a receiving module, configured to receive encoding information in a video bitstream sent by an encoder side, where the encoding information includes a size of a current coding unit, a method for dividing the current coding unit, and parameter information of a current predict unit; and the parameter information of the current predict unit refers to motion vector information of the current predict unit during inter-frame prediction, or the parameter information of the current predict unit refers to prediction direction information of the current predict unit during intra-frame prediction; a first determining module, configured to divide, according to the method for dividing the current coding unit, the size of the current coding unit to obtain a size of the current predict unit; a second determining module, configured to determine a prediction signal of the current predict unit according to the size of the current predict unit and the motion vector information of the current predict unit during the inter-frame prediction and according to an inter-frame prediction mechanism; or determine a prediction signal of the current predict unit according to the size of the current predict unit and the prediction direction information of the current predict unit during the intra-frame prediction and according to an intra-frame prediction mechanism; and a processing module, configured to perform, after a residual operation based on the prediction signal of the current predict unit, decoding processing on the current predict unit to obtain a decoding result of the current predict unit.

With reference to the fourth aspect, in a first possible implementation manner of the fourth aspect, the processing module is specifically configured to: determine a quantization parameter $Qp_{new}$ of the current predict unit according to the prediction signal of the current predict unit; perform, according to the quantization parameter $Qp_{new}$ of the current predict unit, dequantization processing on a discrete cosine transform DCT transform coefficient obtained after quantization processing, to obtain a DCT transform coefficient of the current predict unit, where the encoding information further includes the DCT transform coefficient obtained after the quantization processing; perform inverse discrete cosine transform IDCT processing on the DCT transform coefficient of the current predict unit to obtain a residual of the current predict unit; and determine the decoding result based on a sum of the prediction signal of the current predict unit and the residual of the current predict unit.

With reference to the fourth aspect or the first possible implementation manner of the fourth aspect, in a second possible implementation manner of the fourth aspect, the processing module is specifically configured to: determine energy $Ep'^{local}$ of the current predict unit according to the prediction signal of the current predict unit; determine, according to a reconstructed signal of a decoded reconstructed frame, energy $E'_{global}$ of the reconstructed frame; determine a scale factor $Fp''$ of the current predict unit according to a ratio of the energy $Ep'_{local}$ of the current predict unit to the energy $E'_{global}$ of the reconstructed frame; and determine the quantization parameter $Qp_{new}$ of the current predict unit according to the following formula:

$$Qp_{new}=Qp+6\times\log_2 Fp''; \text{ where}$$

$Qp_{new}$ is the scale factor of the current predict unit, and $Qp$ is an original quantization parameter.

With reference to the second possible implementation manner of the fourth aspect, in a third possible implementation manner of the fourth aspect, the processing module is specifically configured to: determine a minimum unit of k*k pixels, where the current predict unit includes L minimum units, and both k and L are positive integers greater than 1; calculate a variance $V''^f_i$ of an $i^{th}$ minimum unit of the current predict unit of the current frame f according to the following formula:

$$V''^f_i = \sum_{j=1}^{k^2} \left(x''^f_{i,j} - \overline{x}''^f_i\right)^2;$$

where $x''^f_{i,j}$ is a $j^{th}$ pixel value of the $i^{th}$ minimum unit of the current predict unit of the current frame f, and $\overline{x}''^f_i$ indicates an average value of pixel values of the $i^{th}$ minimum unit of the current predict unit of the current frame f; and determine the energy $Ep'_{local}$ of the current predict unit according to the following formula:

$$Ep'_{local} = \frac{1}{L}\sum_{i=1}^{L} \sqrt{\frac{2V''^f_i}{k^2-1} + C};$$

where $C=(\alpha*255)^2$, $\alpha\in(0,1)$.

With reference to the second or the third possible implementation manner of the fourth aspect, in a fourth possible implementation manner of the fourth aspect, the processing module is specifically configured to: the reconstructed frame includes N' minimum units, where N' is a positive integer greater than 1; calculate a variance $V'^{f'}_i$ of an $i^{th}$ minimum unit of the reconstructed frame f' according to the following formula:

$$V'^{f'}_i = \sum_{j=1}^{k^2} \left(x'^{f'}_{i,j} - \overline{x}'^{f'}_i\right)^2;$$

where $x'^{f'}_{i,j}$ is a $j^{th}$ pixel value of the $i^{th}$ minimum unit of the reconstructed frame f', and $\overline{x}'^{f'}_i$ indicates an average value of pixel values of the $i^{th}$ minimum unit of the reconstructed frame f', and determine the energy $E'_{global}$ of the reconstructed frame according to the following formula:

$$E'_{global} = \frac{1}{N'}\sum_{i=1}^{N'} \sqrt{\frac{2V'^{f'}_i}{k^2-1} + C};$$

where $C=(\alpha*255)^2$, $\alpha\in(0,1)$.

According to a fifth aspect, a communications system is provided, where the communications system includes: the encoding device according to any one of the third aspect or the first to the eighth possible implementation manners of the third aspect, and the decoding device according to any one of the fourth aspect or the first the fourth possible implementation manners of the fourth aspect, the encoding device is configured to: receive video data, perform encoding processing on the video data to obtain an encoding result of the video data, and send the encoding result of the video data to the decoding device; and the decoding device is configured to: receive the encoding result of the video data, and perform decoding processing on the encoding result of the video data to obtain the video data.

Based on the foregoing technical solutions, according to the video processing method, the encoding device, and the decoding device in the embodiments of the present invention, a predict unit of a current frame is determined, a Lagrange multiplier of the predict unit is calculated, and encoding processing is performed on video data according to the Lagrange multiplier of the predict unit by using a rate-distortion optimization algorithm, so that inaccuracy caused due to a local feature of the predict unit during motion estimation can be avoided. Therefore, encoding compression efficiency is improved, and an objective of increasing a code rate with same subjective quality or improving video subjective quality at a same bit rate is achieved.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic flowchart of a video processing method according to an embodiment of the present invention;

FIG. 2 is a schematic diagram of predict unit division of inter-frame prediction in the HEVC standard according to an embodiment of the present invention;

FIG. 5 is another schematic flowchart of a video processing method according to an embodiment of the present invention;

DESCRIPTION OF EMBODIMENTS

Figure 3:
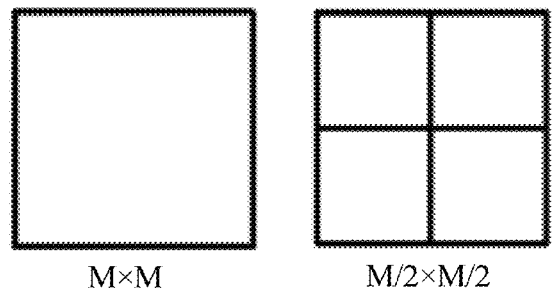
FIG. 3 is a schematic diagram of predict unit division of intra-frame prediction in the HEVC standard according to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that the embodiments of the present invention may be used in encoding and decoding methods of inter-frame prediction or intra-frame prediction in the HEVC video coding standard or the H.264/AVC standard. However, the present invention is not limited thereto.

FIG. 1 shows a schematic flowchart of a video processing method 100 according to an embodiment of the present invention. The method shown in FIG. 1 may be used in an encoding process of an image or a video, and is executed by an encoding device. As shown in FIG. 1, the method includes the following steps:

S110. Receive video data, where the video data is divided into multiple frames, each of the multiple frames is divided into multiple coding units, and each coding unit is divided into at least two predict units.

S120. Calculate a Lagrange multiplier $LambdaP_{new}$ of a current predict unit in a current coding unit, where the current predict unit is a segment of video signal within the current coding unit, the current coding unit is located in a current frame, and the current frame is one of the multiple frames.

S130. Perform, by using the Lagrange multiplier $LambdaP_{new}$ of the current predict unit, encoding processing on the current predict unit according to a rate-distortion optimization algorithm to obtain an encoding result of the current predict unit.

S140. Send the encoding result of the current predict unit to a decoder side.

Specifically, after receiving the video data, the encoding device determines the current predict unit of the current frame by using the rate-distortion optimization algorithm that conforms to a human-eye visual feature, calculates the Lagrange multiplier of the current predict unit, performs the encoding processing on the current predict unit according to the Lagrange multiplier of the current predict unit and the rate-distortion optimization algorithm, and sends the result obtained after the encoding processing to the decoder side.

Therefore, according to the video processing method in this embodiment of the present invention, a current predict unit of a current frame is determined, a Lagrange multiplier of the current predict unit is calculated, and encoding processing is performed on video data according to the Lagrange multiplier of the current predict unit by using a rate-distortion optimization algorithm, so that inaccuracy caused due to a local feature of a predict unit during motion estimation can be avoided. Therefore, encoding compression efficiency is improved, and an objective of increasing a code rate with same subjective quality or improving video subjective quality at a same bit rate is achieved.

It should be understood that this embodiment of the present invention may be applied to encoding processes in multiple scenarios. The following merely uses an inter-frame prediction encoding method in the latest video coding standard HEVC as an example for specific description. However, the present invention is not limited thereto.

In S110, the encoding device obtains the video data. Optionally, the encoding device may receive the video data by using an I/O interface. The video data includes the multiple frames, each frame includes the multiple coding unit (CU), and each coding unit includes at least one predict unit (PU). For example, in the HEVC standard, a coding unit may have four sizes: 64*64, 32*32, 16*16, and 8*8. A coding unit of each size may be divided into predict units of different sizes. As shown in FIG. 2, there are eight predict unit division methods in total, where M indicates a size of a coding unit. The video data obtained by the encoding device includes the multiple frames. Each frame may include multiple coding units of different sizes. Each coding unit may be divided into at least one predict unit by using different division methods.

In S120, the encoding device determines the current predict unit, and calculates the Lagrange multiplier LambdaP$_{new}$ of the current predict unit. Specifically, the encoding device may determine the current predict unit by using the rate-distortion optimization algorithm. In the HEVC standard, four candidate coding units of different sizes are separately determined, where the coding units do not overlap with each other; and as shown in FIG. 2, each candidate coding unit is then divided into at least two candidate predict units according to a size. There are seven candidate predict unit division methods for each candidate coding unit in total, and there are 28 candidate predict units of different sizes in total.

In this embodiment of the present invention, optionally, smoothing processing may be first performed on an original signal of the current frame by using a Gaussian low-pass filter or by using another method, so that an image signal difference can be reduced.

A minimum unit of k*k pixels is taken. The current frame includes N minimum units, a candidate coding unit includes M minimum units, and a candidate predict unit includes L minimum units, where k, N, M, and L are all positive integers greater than 1, and N>M≥L. A variance $V_i^f$ of an $i^{th}$ minimum unit of the current frame f is calculated by using the following formula (2):

$$V_i^f = \sum_{j=1}^{k^2} (x_{i,j}^f - \overline{x_i}^f)^2; \qquad (2)$$

where $x_{i,j}^f$ is a $j^{th}$ pixel value of the $i^{th}$ minimum unit of the current frame f, and $\overline{x_i}^f$ indicates an average value of pixel values of the $i^{th}$ minimum unit of the current frame f.

Energy of the current frame, energy of each candidate coding unit, and energy of each candidate predict unit are respectively calculated by using the following formulas (3) to (5):

$$E_{global} = \frac{1}{N} \sum_{i=1}^{N} \sqrt{\frac{2V_i^f}{k^2-1} + C} \qquad (3)$$

$$Ec_{local} = \frac{1}{M} \sum_{i=1}^{M} \sqrt{\frac{2V_i^f}{k^2-1} + C} \qquad (4)$$

$$Ep_{local} = \frac{1}{L} \sum_{i=1}^{L} \sqrt{\frac{2V_i^f}{k^2-1} + C}; \qquad (5)$$

where $E_{global}$ is the energy of the current frame, $Ec_{local}$ is the energy of the candidate coding unit, $Ep_{local}$ is the energy of the candidate predict unit, and $C=(\alpha*255)^2$, $\alpha \in (0,1)$.

A scale factor Fc of the candidate coding unit and a scale factor Fp of the candidate predict unit that are based on a visual feature are obtained by using the following formulas (6) and (7):

$$Fc = \frac{Ec_{local}}{E_{global}} = \frac{\frac{1}{M}\sum_{i=1}^{M}\sqrt{\frac{2V_i^f}{k^2-1}+C}}{\frac{1}{N}\sum_{i=1}^{N}\sqrt{\frac{2V_i^f}{k^2-1}+C}} \qquad (6)$$

$$Fp = \frac{Ep_{local}}{E_{global}} = \frac{\frac{1}{L}\sum_{i=1}^{L}\sqrt{\frac{2V_i^f}{k^2-1}+C}}{\frac{1}{N}\sum_{i=1}^{N}\sqrt{\frac{2V_i^f}{k^2-1}+C}}; \qquad (7)$$

where the scale factor Fc and the scale factor Fp range from 0 to 2.

Lagrange multipliers are calculated by using the following formulas (8) and (9):

$$LambdaC_{new} = Fc \times Lambda \qquad (8)$$

$$LambdaP_{new} = Fp \times Lambda \qquad (9);$$

where

LambdaC$_{new}$ is a Lagrange multiplier of the candidate coding unit, and LambdaP$_{new}$ is a Lagrange multiplier of the candidate predict unit.

In this embodiment of the present invention, in an inter-frame prediction process in the HEVC standard, the Lagrange multiplier LambdaP$_{new}$ of the candidate predict unit is used for calculation to determine parameter information. During inter-frame prediction, the parameter information may include a motion vector of a current candidate predict unit during motion estimation. Specifically, a calculation process of determining a motion vector by using a predict unit is similar to a process of calculating a motion vector by using a coding unit in the prior art. The motion vector is applied to the rate-distortion optimization algorithm to obtain an optimal predict unit division method for a candidate coding unit of each size. Then, the Lagrange multiplier LambdaC$_{new}$ of each candidate coding unit is applied to the rate-distortion optimization algorithm to obtain an optimal size of a coding unit, so that a division method for an optimal predict unit in the 28 candidate predict units in the HEVC standard is determined. The current frame and the current coding unit are divided by using the division method, so that a corresponding size of the current coding unit and a corresponding size of the current predict unit of the current coding unit are obtained. Optionally, by using the rate-distortion optimization algorithm, a rate-distortion optimization cost may be obtained according to the parameter information, and a division method corresponding to a minimum cost is selected as the optimal division method. The present invention is not limited thereto.

In this embodiment of the present invention, after the current predict unit determined, first energy Ep$_{local}$ corresponding to the current predict unit, a first scale factor Fp corresponding to the current predict unit, the Lagrange multiplier LambdaP$_{new}$ of the current predict unit, and corresponding parameter information can be synchronously determined.

In S130, the encoding device performs the encoding processing on the current predict unit according to the Lagrange multiplier LambdaP$_{new}$ of the current predict unit and the rate-distortion optimization algorithm. Specifically, the encoding device may determine a prediction signal of the current predict unit according to the motion vector that is of the current predict unit and that is in the determined parameter information of the current predict unit and the size of the current predict unit. A difference between the prediction signal of the current predict unit and an original signal of the current predict unit is a residual of the current predict unit. The original signal of the current predict unit is located in the video data obtained by the encoding device. The encoding device performs discrete cosine transform DCT processing on the obtained residual of the current predict unit to obtain a DCT transform coefficient of the current predict unit; after performing quantization processing on the DCT transform coefficient, performs entropy encoding processing on the DCT transform coefficient obtained after the quantization processing, the size of the current coding unit, a method for dividing the current coding unit into the current predict unit, and the parameter information.

In this embodiment of the present invention, the quantization processing may be performed on the DCT transform coefficient by using a quantization parameter of the current predict unit. Specifically, the quantization parameter of the current predict unit may be determined by using the following method.

Optionally, smoothing processing may be first performed on the prediction signal of the current predict unit determined in the current frame and/or a reconstructed signal of a reconstructed frame by means of filtering using a Gaussian low-pass filter or by using another method, so that an image signal difference can be reduced.

A minimum unit of k*k pixels is taken. The current predict unit includes L minimum units, and the reconstructed frame includes N' minimum units, where k, N', and L are all positive integers greater than 1, and N'>L. The encoded reconstructed frame may be a neighboring encoded reconstructed frame prior to the current frame, or may be any non-neighboring encoded reconstructed frame. The present invention is not limited thereto.

Specifically, a variance $V'^{f'}_i$ of an $i^{th}$ minimum unit of the reconstructed frame may be calculated by using the following formula (10):

$$V_i'^{f'} = \sum_{j=1}^{k^2} \left( x_{i,j}'^{f'} - \overline{x}_i'^{f'} \right)^2; \qquad (10)$$

where $x'^{f'}_{i,j}$ is a $j^{th}$ pixel value of the $i^{th}$ minimum unit of the reconstructed frame f', and $\overline{x}_i'^{f'}$ indicates an average value of pixel values of the $i^{th}$ minimum unit of the reconstructed frame f'. Then energy $E'_{global}$ of the reconstructed frame is calculated by using the following formula (11):

$$E'_{global} = \frac{1}{N'} \sum_{i=1}^{N'} \sqrt{\frac{2V_i'^{f'}}{k^2-1} + C}. \qquad (11)$$

Second energy $Ep'_{local}$ of the current predict unit is determined by using the following formulas (12) and (13). Specifically, after the size of the current predict unit is determined, a second variance $V''^f_i$ of an $i^{th}$ minimum unit of the current predict unit of the current frame f is first determined by using the formula (12):

$$V_i''^f = \sum_{j=1}^{k^2} \left( x_{i,j}''^f - \overline{x}_i''^f \right)^2; \qquad (12)$$

where $x''^f_i$ is a $j^{th}$ pixel value of the $i^{th}$ minimum unit of the current frame f, and $\overline{x}_i''^f$ indicates an average value of pixel values of the $i^{th}$ minimum unit of the current predict unit of the current frame f. Then the second energy $Ep'_{local}$ of the current predict unit is calculated by using the formula (13):

$$Ep'_{local} = \frac{1}{L} \sum_{i=1}^{L} \sqrt{\frac{2V_i''^f}{k^2-1} + C}. \qquad (13)$$

The quantization parameter (Qp) is determined according to the second energy of the current predict unit and the energy of the reconstructed frame. A second scale factor Fp" is obtained by using the following formula (14):

$$Fp'' = \frac{Ep'_{local}}{E'_{global}} \frac{\frac{1}{L}\sum_{i=1}^{L} \sqrt{\frac{2V_i''^f}{k^2-1} + C}}{\frac{1}{N'}\sum_{i=1}^{N'} \sqrt{\frac{2V_i'^{f'}}{k^2-1} + C}}. \qquad (14)$$

The second scale factor Fp" is a ratio of the second energy of the current predict unit to the energy of the reconstructed frame. The quantization parameter $Qp_{new}$ of the current predict unit is determined by using the following formula (15):

$$Qp_{new} = Qp + 6 \times \log_2 Fp'' \qquad (15).$$

In this embodiment of the present invention, specifically, the formula (15) can be derived from the following formula (16):

$$\begin{aligned} Qp_{new} &= 6 \times \log_2(Q_{stepnew}) \qquad (16)\\ &= 6 \times \log_2(Q_{step} \times F'_p)\\ &= 6 \times \log_2 Q_{step} + 6 \times \log_2 F'_p\\ &= Qp + 6 \times \log_2 F'_p; \end{aligned}$$

where

Qp and $Q_{step}$ are a quantization parameter and a quantization step that are set by an encoder; and $Qp_{new}$ and $Q_{stepnew}$ are a quantization parameter and a quantization step that are of the current predict unit.

The quantization processing is performed on the DCT transform coefficient by using the quantization parameter $Qp_{new}$, so that the encoding device performs encoding processing on a quantization result.

In S140, the encoding device sends, after the entropy encoding processing, the size of the current coding unit, the method for dividing the current coding unit into the current predict unit, the parameter information, and the DCT transform coefficient that is obtained after the quantization processing to the decoder side, so that a decoding device performs decoding according to received encoding information.

Figure 4:
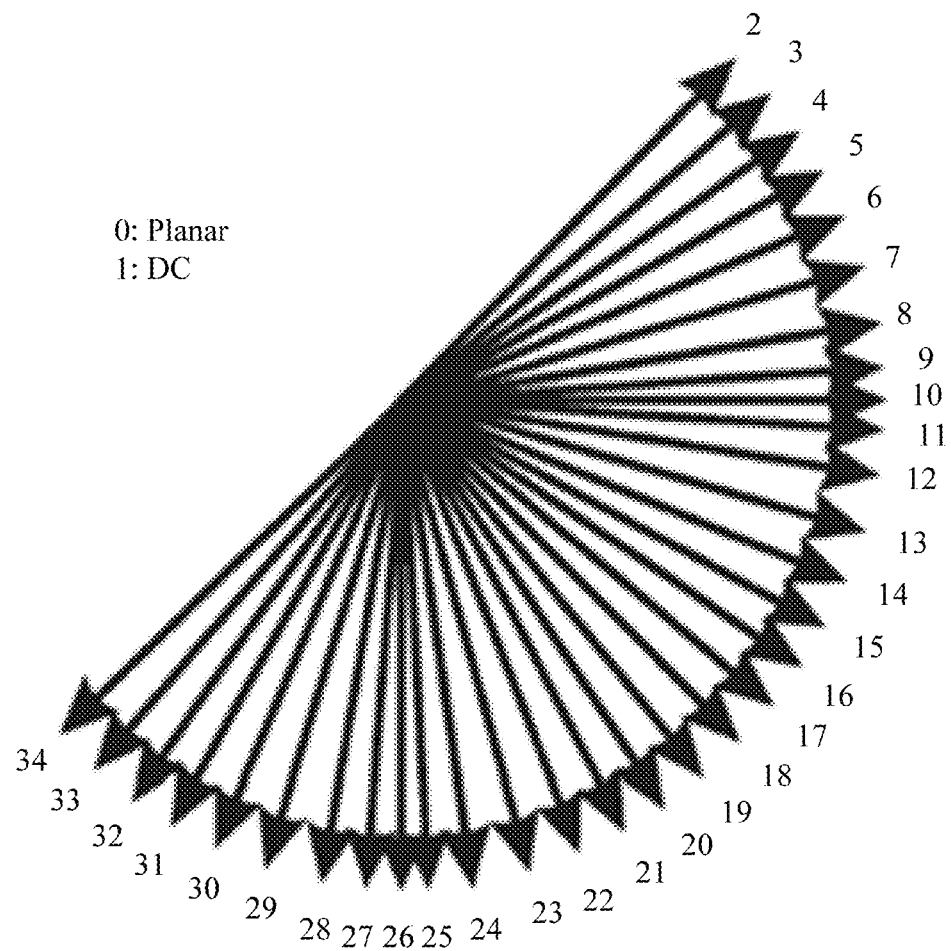
FIG. 4 is a schematic diagram of a prediction direction of intra-frame prediction in the HEVC standard according to an embodiment of the present invention.

It should be understood that in various embodiments of the present invention, the foregoing merely uses the inter-frame prediction encoding method in the HEVC standard as an example for specific description. However, the present invention is not limited thereto. For example, an intra-frame prediction method in the standard is also applicable to this embodiment of the present invention. Specifically, a coding unit of intra-frame prediction has four sizes: 64*64, 32*32, 16*16, and 8*8. A coding unit of each size may be divided into predict units of two sizes shown in FIG. 3. As shown in FIG. 4, each predict unit includes 35 intra-frame prediction directions including DC and planar.

In this embodiment of the present invention, the Lagrange multiplier of the candidate coding unit and the Lagrange multiplier of the candidate predict unit can be calculated by using the foregoing method. The Lagrange multiplier of the candidate coding unit and the Lagrange multiplier of the candidate predict unit are used in the rate-distortion optimization algorithm for mode selection such as coding unit division and predict unit division of the current frame, so that the current predict unit and a division method of the current predict unit are determined. The parameter information determined by using the Lagrange multiplier of the determined current predict unit. In this case, the parameter information includes an intra-frame prediction direction. The prediction signal and the residual of the current predict unit are determined according to the parameter information and the size of the current predict unit, and DCT transform is performed on the residual to obtain the DCT transform coefficient. For the determined current predict unit, the energy of the current predict unit and the energy of the encoded reconstructed frame may further be calculated by using the foregoing method, so that the quantization parameter is determined. The quantization processing is performed on the DCT transform coefficient according to the quantization parameter. The encoding device further sends, after the entropy encoding processing, the size of the current coding unit, the method for dividing the current coding unit into the current predict unit, the parameter information, and the DCT transform coefficient that is obtained after the quantization processing to the decoder side.

Optionally, for the H.264/AVC standard, inter-frame prediction or intra-frame prediction can also be performed by using the foregoing method, so that video coding processing is performed, and details are not described herein again.

It should be understood that in various embodiments of the present invention, sequence numbers of the foregoing processes do not mean an execution order, the execution order of the processes should be determined according to functions and internal logic of the processes, and the sequence numbers should not be construed as any limitation to an implementation process of the embodiments of the present invention.

Therefore, according to the video processing method in this embodiment of the present invention, a current predict unit of a current frame is determined by using a rate-distortion optimization algorithm, and energy of the current predict unit, energy of the current frame, and energy of an encoded reconstructed frame are calculated according to a variance of a video, so that parameter information is determined according to the energy of the current predict unit and the energy of the current frame, and a residual is further determined; then a quantization parameter is determined according to the energy of the current predict unit and the energy of the reconstructed frame, and encoding processing is performed on the video according to the quantization parameter and the parameter information, without a need of performing encoding transmission on the quantization parameter or a variation of the quantization parameter, so that a bit rate is saved. In addition, the energy of the current frame and the energy of the current predict unit are calculated by using a pixel variance of a video image, and by calculating a ratio between the two, a scale factor based on a visual feature is obtained to adjust a Lagrange multiplier in the rate-distortion optimization algorithm. As a result, encoding parameters selected in processes of mode selection and motion estimation conform more to a human-eye visual feature. Therefore, in this embodiment of the present invention, inaccuracy caused due to a local feature during motion estimation can also be avoided, so that encoding compression efficiency is improved, and an objective of increasing a code rate with same subjective quality or improving video subjective quality at a same bit rate is achieved.

FIG. 5 shows a schematic flowchart of a video processing method 200 according to an embodiment of the present invention. The method shown in FIG. 5 may be used in a decoding process of an image or a video, and is executed by a decoding device. As shown in FIG. 5, the method includes the following steps:

S210. Receive encoding information in a video bitstream sent by an encoder side, where the encoding information includes a size of a current coding unit, a method for dividing the current coding unit, and parameter information of a current predict unit; and the parameter information of the current predict unit refers to motion vector information of the current predict unit during inter-frame prediction, or the parameter information of the current predict unit refers to prediction direction information of the current predict unit during intra-frame prediction.

S220. Divide, according to the method for dividing the current coding unit, the size of the current coding unit to obtain a size of the current predict unit.

S230. Determine a prediction signal of the current predict unit according to the size of the current predict unit and the motion vector information of the current predict unit during the inter-frame prediction and according to an inter-frame prediction mechanism; or determine a prediction signal of the current predict unit according to the size of the current predict unit and the prediction direction information of the current predict unit during the intra-frame prediction and according to an intra-frame prediction mechanism.

S240. Perform, after a residual operation based on the prediction signal of the current predict unit, decoding processing on the current predict unit to obtain a decoding result of the current predict unit.

Therefore, according to the video processing method in this embodiment of the present invention, encoding information sent by an encoding device by using a video bitstream is received, and a prediction signal of a current predict unit and a residual of the current predict unit are determined according to the encoding information, so that video data is determined. A predict unit that is of a current frame and that is determined by using a rate-distortion optimization algorithm is determined based on a human-eye visual feature, so that inaccuracy caused due to a local feature of the predict unit during motion estimation can be avoided. Therefore, encoding compression efficiency is improved, and an objective of increasing a code rate with same subjective quality or improving video subjective quality at a same bit rate is achieved.

It should be understood that this embodiment of the present invention may be applied to decoding processes in multiple scenarios. The following merely uses an inter-frame prediction decoding method in the latest video coding standard HEVC as an example for specific description. However, the present invention is not limited thereto.

In S210, the decoding device may receive, by using an I/O interface, the encoding information in the video bitstream sent by the encoding device. The encoding information includes the size of the current coding unit, the method for dividing the current coding unit, and the parameter information of the current predict unit. The parameter information of the current predict unit refers to the motion vector information of the current predict unit during the inter-frame prediction.

In S220, the decoding device divides, according to the method for dividing the current coding unit, the size of the current coding unit to obtain the size of the current predict unit.

In S230, the decoding device determines, by using the inter-frame prediction mechanism, the prediction signal of the current predict unit according to the size of the current predict unit and a motion vector in the parameter information.

In S240, the decoding device performs, after the residual operation based on the prediction signal of the current predict unit, the decoding processing on the current predict unit to obtain the decoding result of the current predict unit. Specifically, the decoding device performs, according to a quantization parameter $Qp_{new}$ of the current predict unit, dequantization processing on a DCT transform coefficient that is obtained after quantization processing and that is in the received encoding information, to obtain a DCT transform coefficient of the current predict unit, and then performs inverse discrete cosine transform IDCT processing on the DCT transform coefficient of the current predict unit to obtain a residual of the current predict unit.

In this embodiment of the present invention, a method for determining the quantization parameter of the current predict unit is specifically as follows. Optionally, smoothing processing may be first performed on a reconstructed signal of a reconstructed frame and the prediction signal of the current predict unit by means of filtering using a Gaussian low-pass filter or by using another method, so that an image signal difference can be reduced.

In this embodiment of the present invention, a minimum unit of k*k pixels is taken. The current predict unit includes L minimum units, and the reconstructed frame includes N' minimum units, where k, N', and L are all positive integers greater than 1, and N'>L. Optionally, the reconstructed frame may be a neighboring encoded reconstructed frame prior to a current frame, or may be any non-neighboring encoded reconstructed frame. The present invention is not limited thereto.

Specifically, a variance $V'^{f}_{i}$ of an $i^{th}$ minimum unit of the reconstructed frame is calculated by using the formula (10), where $x'^{f}_{i,j}$ is a $j^{th}$ pixel value of the $i^{th}$ minimum unit of the reconstructed frame f', and $\overline{x'}^{f}_{i}$ indicates an average value of pixel values of the $i^{th}$ minimum unit of the reconstructed frame f'. Then energy $E'_{global}$ of the reconstructed frame is calculated by using the formula (11).

Energy of the current predict unit is determined by using the formulas (12) and (13). Specifically, after the current predict unit is determined, a variance $V''^{f}_{i}$ of an $i^{th}$ minimum unit of the current predict unit of the current frame f is determined by using the formula (12), where $x''^{f}_{i,j}$ is a $j^{th}$ pixel value of the $i^{th}$ minimum unit of the current frame f, and $\overline{x''}^{f}_{i}$ indicates an average value of pixel values of the $i^{th}$ minimum unit of the current predict unit of the current frame f. Then the energy $Ep'_{local}$ of the current predict unit is calculated by using the formula (13).

The quantization parameter $Qp_{new}$ is determined according to the energy $Ep'_{local}$ of the current predict unit and the energy $E'_{global}$ of the reconstructed frame. Specifically, a scale factor Fp" is obtained by using the formula (14), where the scale factor Fp" is a ratio of the energy $Ep'_{local}$ of the current predict unit to the energy $E'_{global}$ of the reconstructed frame; and then the quantization parameter $Qp_{new}$ of the current predict unit is determined by using the formula (15).

In this embodiment of the present invention, the decoding device performs the dequantization processing on the DCT transform coefficient according to the quantization parameter to obtain the DCT transform coefficient of the current predict unit, and performs the inverse discrete cosine transform IDCT processing on the DCT transform coefficient of the current predict unit, so as to obtain the residual of the current predict unit. The decoding device performs superposition processing according to the residual and the prediction signal, so that the video data can be determined.

It should be understood that in various embodiments of the present invention, the foregoing merely uses the inter-frame prediction decoding method in the HEVC standard as an example for specific description. However, the present invention is not limited thereto. For example, an intra-frame prediction method in the standard is also applicable to this embodiment of the present invention. Specifically, the decoding device obtains the encoding information according to the received video bitstream. The encoding information includes the size of the current coding unit, the method for dividing the current coding unit, and the parameter information of the current predict unit. The parameter information of the current predict unit refers to the prediction direction information of the current predict unit during the intra-frame prediction. The decoding device determines the size of the current predict unit according to the size of the current coding unit and the method for dividing the current coding unit, and determines the prediction signal of the current predict unit according to the size of the current predict unit and the parameter information. The decoding device performs, according to the quantization parameter $Qp_{new}$ of the current predict unit, the dequantization processing on the DCT transform coefficient that is obtained after the quantization processing and that is in the encoding information, to obtain the DCT transform coefficient of the current predict unit, and performs the inverse discrete cosine transform IDCT processing on the DCT transform coefficient of the current predict unit, so as to obtain the residual of the current predict unit; and determines the video data according to the prediction signal of the current predict unit and the residual of the current predict unit.

Optionally, for the H.264/AVC standard, inter-frame prediction or intra-frame prediction can also be performed by using the foregoing method, so that video image decoding processing is performed, and details are not described herein again.

It should be understood that in various embodiments of the present invention, sequence numbers of the foregoing processes do not mean an execution order, the execution order of the processes should be determined according to functions and internal logic of the processes, and the sequence numbers should not be construed as any limitation to an implementation process of the embodiments of the present invention.

It should be understood that in this embodiment of the present invention, "B corresponding to A" indicates that B is associated with A, and that B may be determined according to A. However, it should further be understood that determining B according to A does not mean that B is determined only according to A, but B may also be determined according to A and/or other information.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Therefore, according to the video processing method in this embodiment of the present invention, a decoding device receives, by using a video bitstream, encoding information that is sent by an encoding device and that is determined by using a rate-distortion optimization algorithm. The encoding information includes a size of a current coding unit, a method for dividing the current coding unit, parameter information of a current prediction block, and a DCT transform coefficient that is obtained after quantization processing. The parameter information of a current prediction block refers to motion vector information of the predict unit during inter-frame prediction, or the parameter information of the current predict unit refers prediction direction information of the current predict unit during intra-frame prediction. The decoding device determines the current predict unit according to the size of the current coding unit and the method for dividing the current coding unit that are in the encoding information; determines a prediction signal of the current predict unit according to a size of the current predict unit and the parameter information; performs, according to a calculated quantization parameter $Qp_{new}$ of the current predict unit, dequantization processing on a DCT transform coefficient obtained after quantization processing, to obtain a DCT transform coefficient of the current predict unit; performs inverse discrete cosine transform IDCT processing on the DCT transform coefficient of the current predict unit, so as to obtain a residual; and determines video data according to the prediction signal of the current predict unit and the residual, without a need of performing encoding transmission on the quantization parameter or a variation of the quantization parameter, so that a bit rate is saved. A predict unit that is of a current frame and that is determined by using a rate-distortion optimization algorithm is determined based on a human-eye visual feature. Therefore, in this embodiment of the present invention, inaccuracy caused due to a local feature during motion estimation can also be avoided, so that encoding compression efficiency is improved, and an objective of increasing a code rate with same subjective quality or improving video subjective quality at a same bit rate is achieved.

To better prove a beneficial effect of this embodiment of the present invention compared with the prior art, this embodiment of the present invention is implemented on an encoder HM 10.0 of the latest video coding standard HEVC. Sequences of different resolution are tested in a low-delay P (LDP) configuration, and are compared with performance of the HM 10.0 method. A test result is shown in Table 1. A performance indicator BD-rate is obtained by calculating results at four points 22, 27, 32, and 37 of Qp, objective performance is measured by using an image peak signal to noise ratio (PNSR), and subjective performance is measured by using an SSIM. It can be learned that in this method, performance is improved by 11.5% on average in terms of a subjective evaluation indicator BD-rate (SSIM), and can reach a maximum of 30.3%, that is, when compared with the HM 10.0 method, the method can save a maximum of 30.3% of bit rate in a case of same subjective quality. In addition, by using the method, a loss in an objective evaluation indicator BD-rate (PSNR) is relatively small.

TABLE 1

Algorithm performance on HM 10.0 in an LDP configuration

| Sequence type | Sequence Name | BD-PSNR | BD-SSIM |
| --- | --- | --- | --- |
| Class A | Traffic | −2.9% | −13.7% |
| | PeopleOnStreet | 4.4% | −12.0% |
| Class B | Kimono | 2.4% | −2.5% |
| | Parkscence | 0.5% | −9.5% |
| | Cactus | 5.6% | −7.7% |
| | BasketballDrive | 5.3% | −12.1% |
| | BQTerrance | 9.9% | −20.7% |
| Class C | BasketballDril | −1.6% | −15.4% |
| | BQMall | 3.0% | −9.7% |
| | PartyScence | 1.4% | −11.4% |
| | Racehorses | 5.9% | −8.0% |
| Class D | BasketballPass | 0.4% | −13.5% |
| | BQSquare | 5.0% | −30.3% |
| | BlowingBubbles | 1.5% | −10.0% |
| | RaceHorses | 3.7% | −10.9% |
| Class E | FourPeople | 2.6% | −5.0% |
| | Johnny | 2.8% | −7.9% |
| | KristenAndSara | 5.3% | −6.5% |
| Average value | | 3.1% | −11.5% |

Figure 6A:
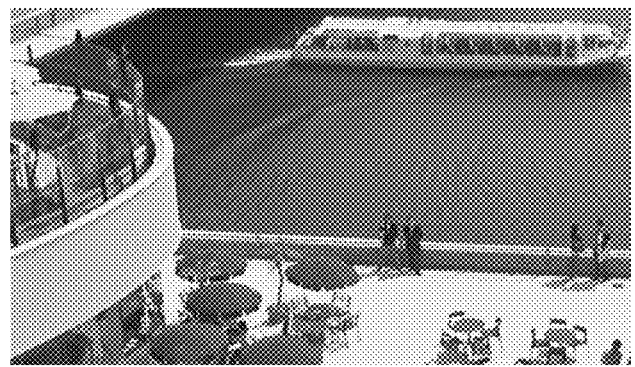
FIG. 6 (a) and FIG. 6 (b) are a comparison diagram of subjective quality of BQSquare according to an embodiment of the present invention.
Figure 6B:
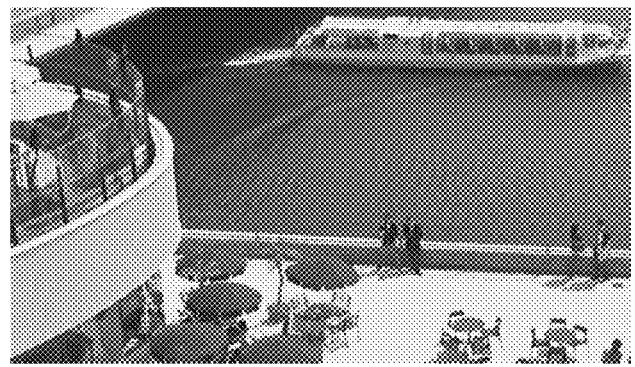

In addition, FIG. 6(a) and FIG. 6 (b) are a schematic diagram of subjective quality when a BQSquare sequence is encoded by using HM 10.0 and this method at two bit rates close to 312.2 kbps. It can be learned that a subjective visual effect of an encoded image (a) obtained by using the method has noticeable improvement compared with that of an encoded image (b) obtained by using an original encoding method used by the HM 10.0, especially in a BQSquare water ripple area. The water ripple area is made clearer by using the method in this embodiment of the present invention than by using the original method of the HM 10.0.

To prove a beneficial effect of "performing smoothing processing on an image to reduce a signal difference" in this embodiment of the present invention, the following test is performed.

Test method: comparing performance of a method in which smoothing processing is performed by means of Gaussian filtering with performance of a method in which no smoothing processing is performed. A comparison result is shown in Table 2.

TABLE 2

Technical point performance

| | | Smoothing processing | | No smoothing processing | |
| --- | --- | --- | --- | --- | --- |
| Sequence type | Sequence name | BD-rate (PSNR) | BD-rate (SSIM) | BD-rate (PSNR) | BD-rate (SSIM) |
| Class A | Traffic | −2.9% | −13.7% | 0.5% | −14.3% |
| | PeopleOnStreet | 4.4% | −12.0% | 8.9% | −11.4% |
| Class B | Kimono | 2.4% | −2.5% | 3.5% | −2.4% |
| | Parkscence | 0.5% | −9.5% | 4.0% | −9.4% |
| | Cactus | 5.6% | −7.7% | 13.8% | −6.1% |
| | BasketballDrive | 5.3% | −12.1% | 12.4% | −11.4% |
| | BQTerrance | 9.9% | −20.7% | 26.4% | −17.0% |
| Class C | BasketballDril | −1.6% | −15.4% | 4.1% | −15.8% |
| | BQmall | 3.0% | −9.7% | 9.1% | −8.5% |

TABLE 2-continued

Technical point performance

| Sequence type | Sequence name | Smoothing processing | | No smoothing processing | |
| --- | --- | --- | --- | --- | --- |
| | | BD-rate (PSNR) | BD-rate (SSIM) | BD-rate (PSNR) | BD-rate (SSIM) |
| | PartyScence | 1.4% | −11.4% | 8.6% | −9.5% |
| | Racehorses | 5.9% | −8.0% | 14.0% | −5.9% |
| Class D | BasketballPass | 0.4% | −13.5% | 5.0% | −14.6% |
| | BQSquare | 5.0% | −30.3% | 16.2% | −29.3% |
| | BlowingBubbles | 1.5% | −10.0% | 6.1% | −9.7% |
| | RaceHorses | 3.7% | −10.9% | 9.8% | −8.8% |
| Class E | FourPeople | 2.6% | −5.0% | 6.9% | −4.2% |
| | Johnny | 2.8% | −7.9% | 4.2% | −6.5% |
| | KristenAndSara | 5.3% | −6.5% | 10.0% | −5.3% |
| Average value | | 3.1% | −11.5% | 9.1% | −10.6% |

It can be learned from Table 2 that signal fluctuation can be reduced when smoothing processing is performed on an image signal, and in terms of experimental data, a loss in objective performance is reduced by 6%, and subjective performance is improved by 0.9%.

The foregoing test can prove necessity and effectiveness of "performing smoothing processing on an image to reduce a signal difference".

Therefore, according to the video processing method in this embodiment of the present invention, a current predict unit of a current frame is determined, a Lagrange multiplier of the current predict unit is calculated, and encoding processing performed on video data according to the Lagrange multiplier of the current predict unit by using a rate-distortion optimization algorithm, so that inaccuracy caused due to a local feature of a predict unit during motion estimation can be avoided. Therefore, encoding compression efficiency is improved, and an objective of increasing a code rate with same subjective quality or improving video subjective quality at a same bit rate is achieved.

Figure 7:
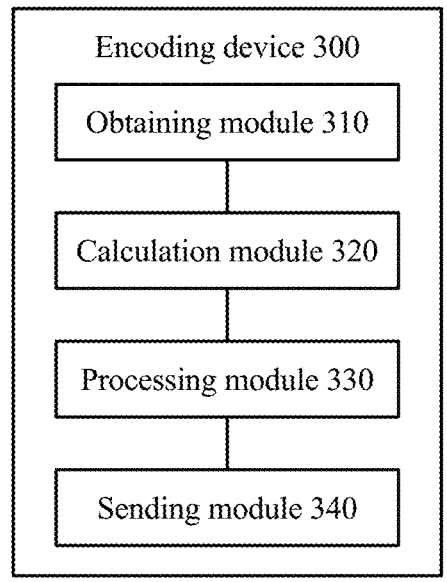
FIG. 7 is a schematic block diagram of an encoding device according to an embodiment of the present invention.
Figure 8:
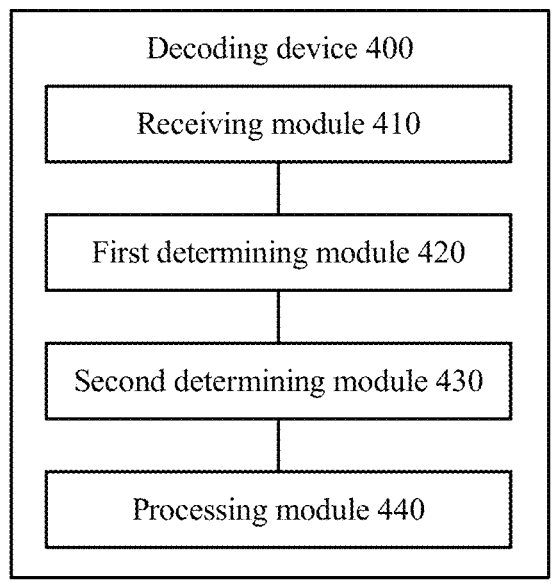
FIG. 8 is a schematic block diagram of a decoding device according to an embodiment of the present invention.

The foregoing describes the video processing methods according to the embodiments of the present invention in detail with reference to FIG. 1 to FIG. 6(a) and FIG. 6 (b), and the following describes an encoding device and a decoding device according to the embodiments of the present invention with reference to FIG. 7 to FIG. 8.

FIG. 7 shows a schematic flowchart of an encoding device 300 according to an embodiment of the present invention. The encoding device may be user equipment, such as UE; or may be a network device, such as an RNC or an eNB. As shown in FIG. 7, the encoding device 300 includes:

an obtaining module 310, configured to receive video data, where the video data is divided into multiple frames, each of the multiple frames is divided into multiple coding units, and each coding unit is divided into at least two predict units;

a calculation module 320, configured to calculate a Lagrange multiplier LambdaP$_{new}$ of a current predict unit in a current coding unit, where the current predict unit is a segment of video signal within the current coding unit, the current coding unit is located in a current frame, and the current frame is one of the multiple frames;

a processing module 330, configured to perform, by using the Lagrange multiplier LambdaP$_{new}$ of the current predict unit, encoding processing on the current predict unit according to a rate-distortion optimization algorithm to obtain an encoding result of the current predict unit; and a sending module 340, configured to send the encoding result of the current predict unit to a decoder side.

Therefore, according to the encoding device in this embodiment of the present invention, a current predict unit of a current frame is determined, a Lagrange multiplier of the current predict unit is calculated, and encoding processing is performed on video data according to the Lagrange multiplier of the current predict unit by using a rate-distortion optimization algorithm, so that inaccuracy caused due to a local feature of a predict unit during motion estimation can be avoided. Therefore, encoding compression efficiency is improved, and an objective of increasing a code rate with same subjective quality or improving video subjective quality at a same bit rate is achieved.

It should be understood that this embodiment of the present invention may be applied to encoding processes in multiple scenarios. The following merely uses an inter-frame prediction encoding method in the latest video coding standard HEVC as an example for specific description. However, the present invention is not limited thereto.

In this embodiment of the present invention, the obtaining module 310 of the encoding device obtains the video data. Optionally, the encoding device may receive the video data by using an I/O interface. The video data includes the multiple frames, each frame includes the multiple coding units, and each coding unit includes at least one predict unit. For example, in the HEVC standard, a coding unit may have four sizes: 64*64, 32*32, 16*16, and 8*8. A coding unit of each size may be divided into predict units of different sizes. As shown in FIG. 2, there are eight predict unit division methods in total, where M indicates a size of a coding unit. The video data obtained by the encoding device includes the multiple frames. Each frame may include multiple coding units of different sizes. Each coding unit may be divided into at least one predict unit by using different division methods.

In this embodiment of the present invention, the calculation module 320 of the encoding device determines the current predict unit, and calculates the Lagrange multiplier LambdaP$_{new}$ of the current predict unit. Specifically, the encoding device may determine the current predict unit by using the rate-distortion optimization algorithm. In the HEVC standard, four candidate coding units of different sizes are separately determined, where the coding units do not overlap with each other; and as shown in FIG. 2, each candidate coding unit is then divided into at least two candidate predict units according to a size. There are seven candidate predict unit division methods for each candidate coding unit in total, and there are 28 candidate predict units of different sizes in total.

In this embodiment of the present invention, optionally, smoothing processing may be first performed on an original signal of the current frame by using a Gaussian low-pass filter or by using another method, so that an image signal difference can be reduced.

A minimum unit of k*k pixels is taken. The current frame includes N minimum units, a candidate coding unit includes M minimum units, and a candidate predict unit includes L minimum units, where k, N, M, and L are all positive integers greater than 1, and N>M≥L. A variance $V_i^f$ of an $i^{th}$ minimum unit of the current frame f is calculated by using the formula (2), where $x_{i,j}^f$ is a $j^{th}$ pixel value of the $i^{th}$ minimum unit of the current frame f, and $\overline{x}_i^f$ indicates an average value of pixel values of the $i^{th}$ minimum unit of the current frame f.

Energy of the current frame, energy of each candidate coding unit, and energy of each candidate predict unit are respectively calculated by using the following formulas (3)

to (5), where $E_{global}$ is the energy of the current frame, $Ec_{local}$ is the energy of the candidate coding unit, $Ep_{local}$ is the energy of the candidate predict unit, and $C=(\alpha*255)^2$, $\alpha \in (0,1)$.

A scale factor Fc of the candidate coding unit and a scale factor Fp of the candidate predict unit that are based on a visual feature are obtained by using the formulas (6) and (7), where the scale factor Fc and the scale factor Fp range from 0 to 2.

Lagrange multipliers are calculated by using the following formulas (8) and (9), where $LambdaC_{new}$ is a Lagrange multiplier of the candidate coding unit, and $LambdaP_{new}$ is a Lagrange multiplier of the candidate predict unit.

In this embodiment of the present invention, in an inter-frame prediction process in the HEVC standard, the Lagrange multiplier $LambdaP_{new}$ of the candidate predict unit is used for calculation to determine parameter information. During inter-frame prediction, the parameter information may include a motion vector of a current candidate predict unit during motion estimation. Specifically, a calculation process of determining a motion vector by using a predict unit is similar to a process of calculating a motion vector by using a coding unit in the prior art. The motion vector is applied to the rate-distortion optimization algorithm to obtain an optimal predict unit division method for a candidate coding unit of each size. Then, the Lagrange multiplier $LambdaC_{new}$ of each candidate coding unit is applied to the rate-distortion optimization algorithm to obtain an optimal size of a coding unit, so that a division method for an optimal predict unit in the 28 candidate predict units in the HEVC standard is determined. The current frame and the current coding unit are divided by using the division method, so that a corresponding size of the current coding unit and a corresponding size of the current predict unit of the current coding unit are obtained. Optionally, by using the rate-distortion optimization algorithm, a rate-distortion optimization cost may be obtained according to the parameter information, and a division method corresponding to a minimum cost is selected as the optimal division method. The present invention is not limited thereto.

In this embodiment of the present invention, after determining the current predict unit, the calculation module 320 may synchronously obtain first energy $Ep_{local}$ corresponding to the current predict unit, a first scale factor Fp corresponding to the current predict unit, the Lagrange multiplier $LambdaP_{new}$ of the current predict unit, and corresponding parameter information by means of calculation.

In this embodiment of the present invention, the processing module 330 of the encoding device performs the encoding processing on the current predict unit according to the Lagrange multiplier $LambdaP_{new}$ that is of the current predict unit and that is obtained by the calculation module 320 by means of calculation and according to the rate-distortion optimization algorithm. Specifically, the processing module 330 of the encoding device may determine a prediction signal of the current predict unit according to the motion vector that is of the current predict unit and that is in the determined parameter information of the current predict unit and the size of the current predict unit. A difference between the prediction signal of the current predict unit and an original signal of the current predict unit is a residual of the current predict unit. The original signal of the current predict unit is located in the video data obtained by the encoding device. The processing module 330 of the encoding device performs discrete cosine transform DCT processing on the obtained residual of the current predict unit to obtain a DCT transform coefficient of the current predict unit; after performing quantization processing on the DCT transform coefficient, performs entropy encoding processing on the DCT transform coefficient obtained after the quantization processing, the size of the current coding unit, a method for dividing the current coding unit into the current predict unit, and the parameter information.

In this embodiment of the present invention, the processing module 330 of the encoding device may perform the quantization processing on the DCT transform coefficient by using a quantization parameter of the current predict unit. Specifically, the quantization parameter of the current predict unit may be determined by using the following method. Optionally, the processing module 330 of the encoding device may first perform smoothing processing on the prediction signal of the current predict unit determined in the current frame and/or a reconstructed signal of a reconstructed frame by means of filtering using a Gaussian low-pass filter or by using another method, so that an image signal difference can be reduced.

A minimum unit of k*k pixels is taken. The current predict unit includes L minimum units, and the reconstructed frame includes N' minimum units, where k, N', and L are all positive integers greater than 1, and N'>L. The encoded reconstructed frame may be a neighboring encoded reconstructed frame prior to the current frame, or may be any non-neighboring encoded reconstructed frame. The present invention is not limited thereto.

Specifically, a variance $V'_i{}^{f'}$ of an $i^{th}$ minimum unit of the reconstructed frame may be calculated by using the formula (10), where $x'_{i,j}{}^{f'}$ is a $j^{th}$ pixel value of the $i^{th}$ minimum unit of the reconstructed frame f', and $\overline{x'_i{}^{f'}}$ indicates an average value of pixel values of the $i^{th}$ minimum unit of the reconstructed frame f'. Then energy $E'_{global}$ of the reconstructed frame is calculated by using the formula (11), and second energy of the current predict unit is determined by using the formulas (12) and (13). Specifically, after determining the current predict unit, the calculation module 320 first determines a second variance $V''_i{}^f$ of an $i^{th}$ minimum unit of the current predict unit of the current frame f by using the formula (12), where $x''_{i,j}{}^f$ is a $j^{th}$ pixel value of the $i^{th}$ minimum unit of the current frame f, and $\overline{x''_i{}^f}$ indicates an average value of pixel values of the $i^{th}$ minimum unit of the current predict unit of the current frame f. Then the second energy $Ep'_{local}$ of the current predict unit is calculated by using the formula (13). The quantization parameter is determined according to the second energy of the current predict unit and the energy of the reconstructed frame. A second scale factor Fp" is obtained by using the formula (14). The second scale factor Fp" is a ratio of the second energy of the current predict unit to the energy of the reconstructed frame. The quantization parameter $Qp_{new}$ of the current predict unit is determined by using the formula (15). The quantization processing is performed on the DCT transform coefficient by using the quantization parameter $Qp_{new}$, so that the encoding device performs encoding processing on a quantization result.

In this embodiment of the present invention, the encoding device sends, after the processing by the processing module 330, the size of the current coding unit, the method for dividing the current coding unit into the current predict unit, the parameter information, and the DCT transform coefficient that is obtained after the quantization processing to the decoder side by using the sending module 340, so that a decoding device performs decoding according to received encoding information.

It should be understood that in various embodiments of the present invention, the foregoing merely uses the encoding device used during inter-frame prediction encoding in the HEVC standard as an example for specific description. However, the present invention is not limited thereto. For example, an intra-frame prediction method in the standard is also applicable to this embodiment of the present invention. Specifically, a coding unit of intra-frame prediction has four sizes: 64*64, 32*32, 16*16, and 8*8. A coding unit of each size may be divided into predict units of two sizes shown in FIG. 3. As shown in FIG. 4, each predict unit includes 35 intra-frame prediction directions including DC and planar.

In this embodiment of the present invention, the calculation module 320 may calculate the Lagrange multiplier of the candidate coding unit and the Lagrange multiplier of the candidate predict unit. The Lagrange multiplier of the candidate coding unit and the Lagrange multiplier of the candidate predict unit are used in the rate-distortion optimization algorithm for mode selection such as coding unit division and predict unit division of the current frame, so that the current predict unit and a division method of the current predict unit are determined. The parameter information determined by using the Lagrange multiplier of the determined current predict unit. In this case, the parameter information includes an intra-frame prediction direction. The processing module 330 determines the prediction signal and the residual of the current predict unit according to the parameter information and the size of the current predict unit, and performs DCT transform on the residual to obtain the DCT transform coefficient. For the determined current predict unit, the energy of the current predict unit and the energy of the encoded reconstructed frame may further be calculated by using the foregoing method, so that the quantization parameter is determined. The quantization processing is performed on the DCT transform coefficient according to the quantization parameter. The sending module 340 of the encoding device further sends the current coding unit, the method for dividing the current coding unit into the current predict unit, the parameter information, and the DCT transform coefficient that is obtained after the quantization processing to the decoder side.

Optionally, for the H.264/AVC standard, inter-frame prediction or intra-frame prediction can also be performed by using the foregoing method, so that video coding processing is performed, and details are not described herein again.

It should be understood that in various embodiments of the present invention, sequence numbers of the foregoing processes do not mean an execution order, the execution order of the processes should be determined according to functions and internal logic of the processes, and the sequence numbers should not be construed as any limitation to an implementation process of the embodiments of the present invention.

Therefore, according to the encoding device in this embodiment of the present invention, a current predict unit of a current frame is determined by using a rate-distortion optimization algorithm, and energy of the current predict unit, energy of the current frame, and energy of an encoded reconstructed frame are calculated according to a variance of a video, so that parameter information is determined according to the energy of the current predict unit and the energy of the current frame, and a residual is further determined; then a quantization parameter is determined according to the energy of the current predict unit and the energy of the reconstructed frame, and encoding processing is performed on the video according to the quantization parameter and a parameter, without a need of performing encoding transmission on the quantization parameter or a variation of the quantization parameter, so that a bit rate is saved. In addition, the energy of the current frame and the energy of the current predict unit are calculated by using a pixel variance of a video image, and by calculating a ratio between the two, a scale factor based on a visual feature is obtained to adjust a Lagrange multiplier in the rate-distortion optimization algorithm. As a result, encoding parameters selected in processes of mode selection and motion estimation conform more to a human-eye visual feature. Therefore, in this embodiment of the present invention, inaccuracy caused due to a local feature during motion estimation can also be avoided, so that encoding compression efficiency is improved, and an objective of increasing a code rate with same subjective quality or improving video subjective quality at a same bit rate is achieved.

The foregoing describes the encoding device 300 according to this embodiment of the present invention in detail with reference to FIG. 7. The following describes a decoding device according to an embodiment of the present invention with reference to FIG. 8.

FIG. 8 shows a schematic flowchart of a decoding device 400 according to an embodiment of the present invention. The decoding device may be user equipment, such as UE; or may be a network device, such as an RNC or an eNB. As shown in FIG. 8, the decoding device 400 includes:

a receiving module 410, configured to receive encoding information in a video bitstream sent by an encoder side, where the encoding information includes a size of a current coding unit, a method for dividing the current coding unit, and parameter information of a current predict unit; and the parameter information of the current predict unit refers to motion vector information of the current predict unit during inter-frame prediction, or the parameter information of the current predict unit refers to prediction direction information of the current predict unit during intra-frame prediction;

a first determining module 420, configured to divide, according to the method for dividing the current coding unit, the size of the current coding unit to obtain a size of the current predict unit;

a second determining module 430, configured to determine a prediction signal of the current predict unit according to the size of the current predict unit and the motion vector information of the current predict unit during the inter-frame prediction and according to an inter-frame prediction mechanism; or determine a prediction signal of the current predict unit according to the size of the current predict unit and the prediction direction information of the current predict unit during the intra-frame prediction and according to an intra-frame prediction mechanism; and a processing module 440, configured to perform, after a residual operation based on the prediction signal of the current predict unit, decoding processing on the current predict unit to obtain a decoding result of the current predict unit.

Therefore, according to the decoding device in this embodiment of the present invention, encoding information sent by an encoding device by using a video bitstream is received, and a prediction signal of a current predict unit and a residual of the current predict unit are determined according to the encoding information, so that video data is determined. A predict unit that is of a current frame and that is determined by using a rate-distortion optimization algorithm is determined based on a human-eye visual feature, so that inaccuracy caused due to a local feature of the predict unit during motion estimation can be avoided. Therefore, encoding compression efficiency is improved, and an objective of increasing a code rate with same subjective quality or improving video subjective quality at a same bit rate is achieved.

It should be understood that this embodiment of the present invention may be applied to decoding processes in multiple scenarios. The following merely uses an inter-frame prediction decoding method in the latest video coding standard HEVC as an example for specific description. However, the present invention is not limited thereto.

In this embodiment of the present invention, the receiving module 410 of the decoding device receives the encoding information in the video bitstream sent by the encoding device. The encoding information includes the size of the current coding unit, the method for dividing the current coding unit, and the parameter information of the current predict unit. The parameter information of the current predict unit refers to the motion vector information of the current predict unit during the inter-frame prediction.

In this embodiment of the present invention, the decoding device determines, by using the first determining module 420, the size of the current predict unit according to the size of the current coding unit and the method for dividing the current coding unit that are received by the receiving module 410.

In this embodiment of the present invention, the second determining module 430 of the decoding device determines, by using the inter-frame prediction mechanism, the prediction signal of the current predict unit according to the size of the current predict unit and a motion vector in the parameter information.

In this embodiment of the present invention, the processing module 440 of the decoding device performs, after the residual operation based on the prediction signal that is of the current predict unit and that is determined by the second determining module 430, the decoding processing on the current predict unit to obtain the decoding result of the current predict unit. Specifically, the decoding device performs, according to a quantization parameter $Qp_{new}$ of the current predict unit, dequantization processing on a DCT transform coefficient that is obtained after quantization processing and that is in the received encoding information, to obtain a DCT transform coefficient of the current predict unit, and then performs inverse discrete cosine transform IDCT processing on the DCT transform coefficient of the current predict unit to obtain a residual of the current predict unit.

In this embodiment of the present invention, a method for determining the quantization parameter of the current predict unit by the processing module 440 of the decoding device is as follows. Optionally, smoothing processing may be first performed on a reconstructed signal of a reconstructed frame and the prediction signal of the current predict unit by means of filtering using a Gaussian low-pass filter or by using another method, so that an image signal difference can be reduced.

In this embodiment of the present invention, a minimum unit of k*k pixels is taken. The current predict unit includes L minimum units, and the reconstructed frame includes N' minimum units, where k, N', and L are all positive integers greater than 1, and N'>L. Optionally, the reconstructed frame may be a neighboring encoded reconstructed frame prior to a current frame, or may be any non-neighboring encoded reconstructed frame. The present invention is not limited thereto.

Specifically, a variance $V'^f_i$ of an $i^{th}$ minimum unit of the reconstructed frame is calculated by using the formula (10), where $x'^f_{i,j}$ is a $j^{th}$ pixel value of the $i^{th}$ minimum unit of the reconstructed frame f', and $\overline{x'}^f_i$ indicates an average value of pixel values of the $i^{th}$ minimum unit of the reconstructed frame f'. Then energy $E'_{global}$ of the reconstructed frame is calculated by using the formula (11).

Energy of the current predict unit is determined by using the formulas (12) and (13). Specifically, after the current predict unit is determined, a variance $V''^f_i$ of an $i^{th}$ minimum unit of the current predict unit of the current frame f is determined by using the formula (12), where $x''^f_{i,j}$ is a $j^{th}$ pixel value of the $i^{th}$ minimum unit of the current frame f', and $\overline{x''}^f_i$ indicates an average value of pixel values of the $i^{th}$ minimum unit of the current predict unit of the current frame f'. Then the energy $Ep'_{local}$ of the current predict unit is calculated by using the formula (13).

The quantization parameter $Qp_{new}$ is determined according to the energy $Ep'_{local}$ of the current predict unit and the energy $E'_{global}$ of the reconstructed frame. Specifically, a scale factor $Fp''$ is obtained by using the formula (14), where the scale factor $Fp''$ is a ratio of the energy $Ep'_{local}$ of the current predict unit to the energy $E'_{global}$ of the reconstructed frame; and then the quantization parameter $Qp_{new}$ of the current predict unit is determined by using the formula (15).

In this embodiment of the present invention, the decoding device performs the dequantization processing on the DCT transform coefficient according to the quantization parameter to obtain the DCT transform coefficient of the current predict unit, and performs the inverse discrete cosine transform IDCT processing on the DCT transform coefficient of the current predict unit, so as to obtain the residual of the current predict unit. The decoding device performs superposition processing according to the residual and the prediction signal, so that the video data can be determined.

It should be understood that in various embodiments of the present invention, the foregoing merely uses the decoding device used during inter-frame prediction decoding in the HEVC standard as an example for specific description. However, the present invention is not limited thereto. For example, an intra-frame prediction method in the standard is also applicable to this embodiment of the present invention. Specifically, the receiving module 410 of the decoding device obtains the encoding information according to the received video bitstream. The encoding information includes the size of the current coding unit, the method for dividing the current coding unit, and the parameter information of the current predict unit. The parameter information of the current predict unit refers to the prediction direction information of the current predict unit during the intra-frame prediction. The first determining module 420 determines the size of the current predict unit according to the size of the coding unit and the method for dividing the current coding unit. The second determining module 430 of the decoding device determines the prediction signal of the current predict unit according to the size of the current predict unit and the parameter information. The processing module 440 of the decoding device performs, according to the quantization parameter $Qp_{new}$ of the current predict unit, dequantization processing on the DCT transform coefficient that is obtained after the quantization processing and that is in the encoding information, to obtain a DCT transform coefficient of the current predict unit, and performs the inverse discrete cosine transform IDCT processing on the DCT transform coefficient of the current predict unit, so as to obtain the residual of the current predict unit; and determines the video data according to the prediction signal of the current predict unit and the residual of the current predict unit.

Optionally, for the H.264/AVC standard, inter-frame prediction or intra-frame prediction can also be performed by using the foregoing method, so that video decoding processing is performed, and details are not described herein again.

It should be understood that in this embodiment of the present invention, "B corresponding to A" indicates that B is associated with A, and that B may be determined according to A. However, it should further be understood that determining B according to A does not mean that B is determined only according to A, but B may also be determined according to A and/or other information.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Therefore, according to the decoding device in this embodiment of the present invention, a decoding device receives, by using a video bitstream, encoding information that is sent by an encoding device and that is determined by using a rate-distortion optimization algorithm. The encoding information includes a size of a current coding unit, a method for dividing the current coding unit, parameter information, and a DCT transform coefficient that is obtained after quantization processing. The parameter information refers to motion vector information of a current predict unit during inter-frame prediction, or the parameter information of the current predict unit refers to prediction direction information of the current predict unit during intra-frame prediction. The decoding device determines the current predict unit according to the size of the coding unit and the method for dividing the current coding unit that are in the encoding information; determines a prediction signal of the current predict unit according to a size of the predict unit and the parameter information; performs, according to a calculated quantization parameter $Qp_{new}$ of the current predict unit, dequantization processing on a DCT transform coefficient obtained after quantization processing, to obtain a DCT transform coefficient of the current predict unit; performs inverse discrete cosine transform IDCT processing on the DCT transform coefficient of the current predict unit, so as to obtain a residual; and determines video data according to the prediction signal of the current predict unit and the residual, without a need of performing encoding transmission on the quantization parameter or a variation of the quantization parameter, so that a bit rate is saved. A predict unit that is of a current frame and that is determined by using a rate-distortion optimization algorithm is determined based on a human-eye visual feature. Therefore, in this embodiment of the present invention, inaccuracy caused due to a local feature during motion estimation can also be avoided, so that encoding compression efficiency is improved, and an objective of increasing a code rate with same subjective quality or improving video subjective quality at a same bit rate is achieved.

Figure 9:
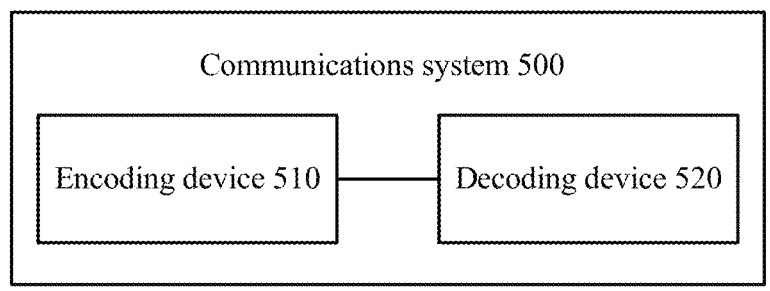
FIG. 9 is a schematic block diagram of a communications system according to an embodiment of the present invention.

As shown in FIG. 9, an embodiment of the present invention further provides a communications system 500, including an encoding device 510 and a decoding device 520. The encoding device is configured to: receive video data, perform encoding processing on the video data to obtain an encoding result of the video data, and send the encoding result of the video data to the decoding device. The decoding device is configured to: receive the encoding result of the video data, and perform decoding processing on the encoding result of the video data to obtain the video data.

The encoding device 510 may be the encoding device 300 shown in FIG. 7, and the decoding device 520 may be the decoding device 400 shown in FIG. 8.

The encoding device 510 may further include the obtaining module 310, the calculation module 320, the processing module 330, and the sending module 340 shown in FIG. 7. The decoding device 520 may further include the receiving module 410, the first determining module 420, the second determining module 430, and the processing module 440 shown in FIG. 8.

According to the communications system in this embodiment of the present invention, an encoding device determines a current predict unit of a current frame, calculates a Lagrange multiplier of the current predict unit, performs, by using a rate-distortion optimization algorithm, encoding processing on video data according to the Lagrange multiplier of the current predict unit, and sends an encoding result to a decoding device. The decoding device performs decoding processing according to the received encoding information to obtain the video data, so that inaccuracy caused due to a local feature of a predict unit during motion estimation can be avoided. Therefore, encoding compression efficiency is improved, and an objective of increasing a code rate with same subjective quality or improving video subjective quality at a same bit rate is achieved.

Figure 10:
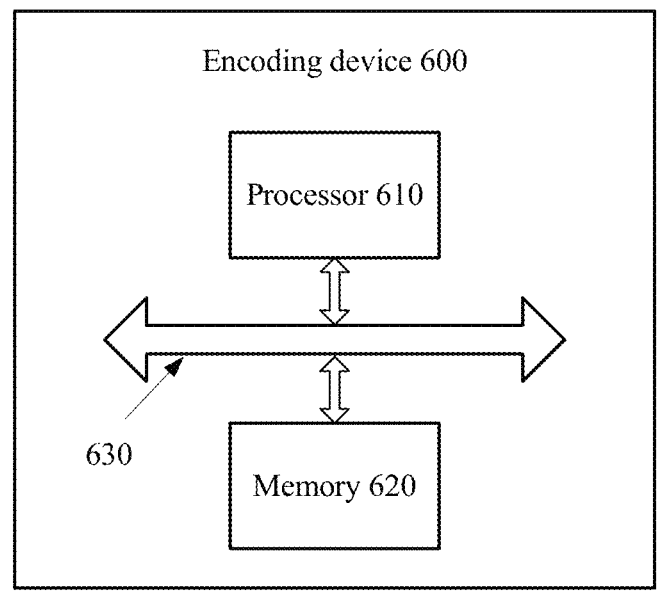
FIG. 10 is another schematic block diagram of an encoding device according to an embodiment of the present invention.

As shown in FIG. 10, an embodiment of the present invention further provides an encoding device 600, including a processor 610, a memory 620, and a bus system 630. The processor 610 is connected to the memory 620 by using the bus system 630. The memory 620 is configured to store an instruction. The processor 610 is configured to execute the instruction stored by the memory 620. The encoding device 600 receives video data by using an I/O interface. The video data is divided into multiple frames, each of the multiple frames is divided into multiple coding units, and each coding unit is divided into at least two predict units. The memory 620 of the encoding device 600 stores program code, and the processor 610 may invoke the program code stored in the memory 620 to perform the following operations:

calculating a Lagrange multiplier $LambdaP_{new}$ of a current predict unit in a current coding unit, where the current predict unit is a segment of video signal within the current coding unit, the current coding unit is located in a current frame, and the current frame is one of the multiple frames;

performing, by using the Lagrange multiplier $LambdaP_{new}$ of the current predict unit, encoding processing on the current predict unit according to a rate-distortion optimization algorithm to obtain an encoding result of the current predict unit; and sending the encoding result of the current predict unit to a decoder side.

Therefore, according to the encoding device in this embodiment of the present invention, a current predict unit of a current frame is determined, a Lagrange multiplier of the current predict unit is calculated, and encoding processing is performed on video data according to the Lagrange multiplier of the current predict unit by using a rate-distortion optimization algorithm, so that inaccuracy caused due to a local feature of a predict unit during motion estimation can be avoided. Therefore, encoding compression efficiency is improved, and an objective of increasing a code rate with same subjective quality or improving video subjective quality at a same bit rate is achieved.

It should be understood that in this embodiment of the present invention, the processor 610 may be a central processing unit (CPU), or the processor 610 may be another general purpose processor, a digital signal processor (DSP), an application-specific integrated circuit (ASIC), a field programmable gate array (FPGA), another programmable logic device, a discrete gate or transistor logic device, a discrete hardware assembly, or the like. The general purpose processor may be a microprocessor or the processor may also be any conventional processor, or the like.

The memory 620 may include a read-only memory and a random access memory, and provides an instruction and data for the processor 610. A part of the memory 620 may further include a nonvolatile random access memory. For example, the memory 620 may further store information about a device type.

In addition to a data bus, the bus system 630 may further include a power bus, a control bus, a status signal bus, and the like. However, for clarity of description, various buses are marked as the bus system 630 in the figure.

In an implementation process, the steps in the foregoing method may be completed by using an integrated logic circuit of hardware in the processor 610 or an instruction in a form of software. Steps of the methods disclosed with reference to the embodiments of the present invention may be directly executed and completed by a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 620. The processor 610 reads information in the memory 620, and completes the steps of the foregoing method in combination with hardware of the memory 620. To avoid repetition, details are not described herein again.

Optionally, in an embodiment, the processor 610 may invoke the program code stored in the memory 620 to perform the following operations: determining the current predict unit; calculating energy $E_{global}$ of the current frame and first energy $Ep_{local}$ of the current predict unit; determining a first scale factor Fp of the current predict unit according to a ratio of the first energy $Ep_{local}$ of the current predict unit to the energy $E_{global}$ of the current frame; where the first scale factor Fp ranges from 0 to 2; and performing, by using the first scale factor Fp, scaling processing on a Lagrange multiplier Lambda to obtain the Lagrange multiplier LambdaP$_{new}$ of the current predict unit.

Optionally, in an embodiment, the processor 610 may invoke the program code stored in the memory 620 to perform the following operations: calculating a Lagrange multiplier of each candidate predict unit in Y candidate predict units, where Y is an integer greater than or equal to 2; determining, by using a Lagrange multiplier of an $x^{th}$ candidate predict unit in the Y candidate predict units, parameter information of the $x^{th}$ candidate predict unit according to the rate-distortion optimization algorithm, where x needs to be each integer in [1, Y], parameter information of the current predict unit refers to motion vector information of the $x^{th}$ candidate predict unit during inter-frame prediction, or parameter information of the current predict unit refers to prediction direction information of the $x^{th}$ candidate predict unit during intra-frame prediction; determining, by using the rate-distortion optimization algorithm, a candidate predict unit from the Y candidate predict units as a target candidate predict unit according to motion vector information of each candidate predict unit in the Y candidate predict units during the inter-frame prediction or according to prediction direction information of each candidate predict unit in the Y candidate predict units during the intra-frame prediction; and dividing, by using the target candidate predict unit, the current coding unit to obtain the current predict unit.

Optionally, in an embodiment, the processor 610 may invoke the program code stored in the memory 620 to perform the following operations: determining a prediction signal of the current predict unit according to a size of the current predict unit and motion vector information of the current predict unit during the inter-frame prediction and according to an inter-frame prediction mechanism; or determining a prediction signal of the current predict unit according to a size of the current predict unit and prediction direction information of the current predict unit during the intra-frame prediction and according to an intra-frame prediction mechanism; and performing, after a residual operation based on the prediction signal of the current predict unit, entropy encoding on the current predict unit to obtain the encoding result of the current predict unit.

Optionally, in an embodiment, the processor 610 may invoke the program code stored in the memory 620 to perform the following operations: obtaining a residual of the current predict unit according to a received difference between a video signal of the current predict unit and the prediction signal of the current predict unit, where the video signal of the current predict unit is located in the video data; performing discrete cosine transform DCT processing on the residual of the current predict unit to obtain a DCT transform coefficient of the current predict unit; performing quantization processing on the DCT transform coefficient according to a quantization parameter Qp$_{new}$ of the current predict unit; and performing entropy encoding processing on a size of the current coding unit, a manner of dividing the current coding unit by using the target candidate predict unit, the parameter information of the current predict unit, and the DCT transform coefficient that is obtained after the quantization processing, to obtain the encoding result of the current predict unit.

Optionally, in an embodiment, the processor 610 may invoke the program code stored in the memory 620 to perform the following operations: determining second energy Ep'$_{local}$ of the current predict unit according to the prediction signal of the current predict unit; determining, according to a reconstructed signal of an encoded reconstructed frame, energy E'$_{global}$ of the reconstructed frame; determining a second scale factor Fp" of the current predict unit according to a ratio of the second energy Ep'$_{local}$ of the current predict unit to the energy E'$_{global}$ of the reconstructed frame; and determining the quantization parameter Qp$_{new}$ according to the following formula:

$$Qp_{new} = Qp + 6 \times \log_2 Fp''; \text{ where}$$

Fp" is the second scale factor, and Qp is an original quantization parameter; and performing the quantization processing on the DCT transform coefficient according to the quantization parameter.

It should be understood that the encoding device 600 according to this embodiment of the present invention may be corresponding to the encoding device 300 in the embodiment of the present invention, or may be corresponding to a corresponding execution body of the method 100 according to the embodiment of the present invention. In addition, the foregoing and other operations and/or functions of the modules in the encoding device 600 are separately used to implement corresponding procedures of methods in FIG. 1 to FIG. 4. For brevity, details are not described herein again.

Therefore, according to the encoding device in this embodiment of the present invention, a current predict unit of a current frame is determined, a Lagrange multiplier of the current predict unit is calculated, and encoding processing is performed on video data according to the Lagrange multiplier of the current predict unit by using a rate-distortion optimization algorithm, so that inaccuracy caused due to a local feature of a predict unit during motion estimation can be avoided. Therefore, encoding compression efficiency is improved, and an objective of increasing a code rate with same subjective quality or improving video subjective quality at a same bit rate is achieved.

Figure 11:
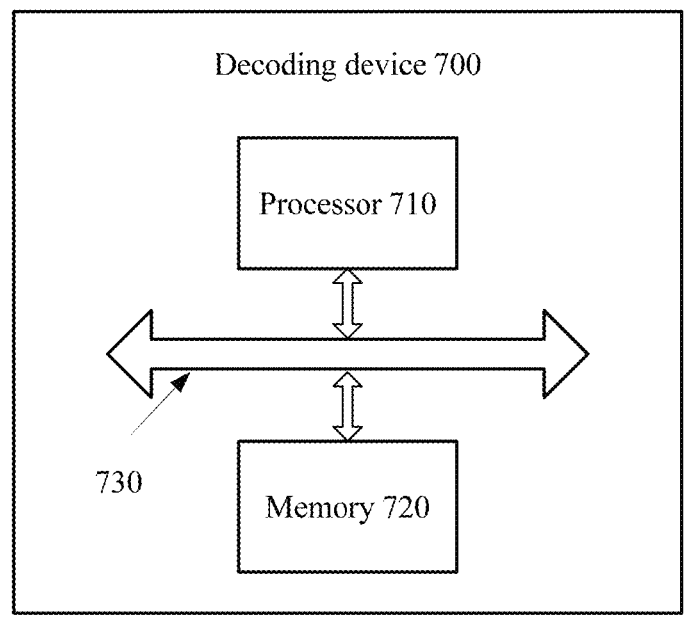
FIG. 11 is another schematic block diagram of a decoding device according to an embodiment of the present invention.

As shown in FIG. 11, an embodiment of the present invention further provides a decoding device 700, including a processor 710, a memory 720, and a bus system 730. The processor 710 is connected to the memory 720 by using the bus system 730. The memory 720 is configured to store an instruction. The processor 710 configured to execute the instruction stored by the memory 720. The decoding device 700 receives, by using an I/O interface, encoding information in a video bitstream sent by an encoder side. The encoding information includes a size of a current coding unit, a method for dividing the current coding unit, and parameter information of a current predict unit. The parameter information of the current predict unit refers to motion vector information of the current predict unit during inter-frame prediction, or the parameter information of the current predict unit refers to prediction direction information of the current predict unit during intra-frame prediction. The memory 720 of the decoding device 700 stores program code, and the processor 710 may invoke the program code stored in the memory 720 to perform the following operations:

dividing, according to the method for dividing the current coding unit, the size of the current coding unit to obtain a size of the current predict unit;

determining a prediction signal of the current predict unit according to the size of the current predict unit and the motion vector information of the current predict unit during the inter-frame prediction and according to an inter-frame prediction mechanism; or determining a prediction signal of the current predict unit according to the size of the current predict unit and the prediction direction information of the current predict unit during the intra-frame prediction and according to an intra-frame prediction mechanism; and performing, after a residual operation based on the prediction signal of the current predict unit, decoding processing on the current predict unit to obtain a decoding result of the current predict unit.

Therefore, according to the decoding device in this embodiment of the present invention, encoding information sent by an encoding device by using a video bitstream is received, and a prediction signal of a current predict unit and a residual of the current predict unit are determined according to the encoding information, so that video data is determined. A predict unit that is of a current frame and that is determined by using a rate-distortion optimization algorithm is determined based on a human-eye visual feature, so that inaccuracy caused due to a local feature of the predict unit during motion estimation can be avoided. Therefore, encoding compression efficiency is improved, and an objective of increasing a code rate with same subjective quality or improving video subjective quality at a same bit rate is achieved.

It should be understood that in this embodiment of the present invention, the processor 710 may be a CPU, or the processor 710 may be another general purpose processor, a digital signal processor (DSP), an application-specific integrated circuit (ASIC), a field programmable gate array (FPGA), another programmable logic device, a discrete gate or transistor logic device, a discrete hardware assembly, or the like. The general purpose processor may be a microprocessor or the processor may also be any conventional processor, or the like.

The memory 720 may include a read-only memory and a random access memory, and provides an instruction and data for the processor 710. A part of the memory 720 may further include a nonvolatile random access memory. For example, the memory 720 may further store information about a device type.

In addition to a data bus, the bus system 730 may further include a power bus, a control bus, a status signal bus, and the like. However, for clarity of description, various buses are marked as the bus system 730 in the figure.

In an implementation process, the steps in the foregoing method may be completed by using an integrated logic circuit of hardware in the processor 710 or an instruction in a form of software. Steps of the methods disclosed with reference to the embodiments of the present invention may be directly executed and completed by a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 720. The processor 710 reads information in the memory 720, and completes the steps of the foregoing method in combination with hardware of the memory 720. To avoid repetition, details are not described herein again.

Optionally, in an embodiment, the processor 710 may invoke the program code stored in the memory 720 to perform the following operations: determining a quantization parameter $Qp_{new}$ of the current predict unit according to the prediction signal of the current predict unit; performing, according to the quantization parameter $Qp_{new}$ of the current predict unit, dequantization processing on a discrete cosine transform DCT transform coefficient obtained after quantization processing, to obtain a DCT transform coefficient of the current predict unit, where the encoding information further includes the DCT transform coefficient obtained after the quantization processing; performing inverse discrete cosine transform IDCT processing on the DCT transform coefficient of the current predict unit to obtain a residual of the current predict unit; and determining the decoding result based on a sum of the prediction signal of the current predict unit and the residual of the current predict unit.

Optionally, in an embodiment, the processor 710 may invoke the program code stored in the memory 720 to perform the following operations: determining energy $Ep'_{local}$ of the current predict unit according to the prediction signal of the current predict unit; determining, according to a reconstructed signal of a decoded reconstructed frame, energy $E'_{global}$ of the reconstructed frame; determining a scale factor $Fp''$ of the current predict unit according to a ratio of the energy $Ep'_{local}$ of the current predict unit to the energy $E'_{global}$ of the reconstructed frame; and determining the quantization parameter $Qp_{new}$ of the current predict unit according to the following formula:

$$Qp_{new}=Qp+6\times\log_2 Fp''; \text{ where}$$

$Qp_{new}$ is the scale factor of the current predict unit, and Qp is an original quantization parameter.

It should be understood that the decoding device 700 according to this embodiment of the present invention may be corresponding to the decoding device 400 in the embodiment of the present invention, or may be corresponding to a corresponding execution body of the method 200 according to the embodiment of the present invention. In addition, the foregoing and other operations and/or functions of the modules in the decoding device 700 are separately used to implement corresponding procedures of methods in FIG. 5. For brevity, details are not described herein again.

Therefore, according to the decoding device in this embodiment of the present invention, encoding information sent by an encoding device by using a video bitstream is received, and a prediction signal of a current predict unit and a residual of the current predict unit are determined according to the encoding information, so that video data is determined. A predict unit that is of a current frame and that is determined by using a rate-distortion optimization algorithm is determined based on a human-eye visual feature, so that inaccuracy caused due to a local feature of the predict unit during motion estimation can be avoided. Therefore, encoding compression efficiency is improved, and an objective of increasing a code rate with same subjective quality or improving video subjective quality at a same bit rate is achieved.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, device, and unit, reference may be made to a corresponding process in the foregoing method embodiments, and details are not described herein again.

In the several embodiments provided in the present application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method of video processing, comprising:
    receiving video data comprising multiple frames, wherein each of the frames is divided into multiple coding units, and wherein each of the coding units is divided into at least two predict units;
    calculating a Lagrange multiplier LambdaP$_{new}$ of a current predict unit in a current coding unit, wherein the current coding unit is located in a current frame that is one of the frames, and wherein the calculating comprises:
        determining the current predict unit;
        calculating an energy E$_{global}$ of the current frame;
        calculating a first energy Ep$_{local}$ of the current predict unit;
        determining a first scale factor Fp of the current predict unit according to a ratio of the first energy Ep$_{local}$ to the energy E$_{global}$, wherein the first scale factor Fp is in a range from 0 to 2; and
        performing, using the first scale factor Fp, scaling processing on a Lagrange multiplier Lambda to obtain the Lagrange multiplier LambdaP$_{new}$ of the current predict unit, wherein the current predict unit is a segment of video signal within the current coding unit;
    performing, using the Lagrange multiplier LambdaP$_{new}$ of the current predict unit, encoding processing on the current predict unit according to a rate-distortion optimization algorithm to obtain an encoding result of the current predict unit; and sending the encoding result of the current predict unit to a decoder side.

2. The method of claim 1, wherein calculating the energy $E_{global}$ and the first energy $Ep_{local}$ comprises:

determining a minimum unit of k*k pixels, wherein the current frame comprises N minimum units, and the current predict unit comprises L minimum units, wherein k, N and L are all integers greater than 1, and N>L;

calculating a first variance $V_i^f$ of an $i^{th}$ minimum unit of the current frame according to the following formula:

$$V_i^f = \sum_{j=1}^{k^2} (x_{i,j}^f - \overline{x_i^f})^2,$$

wherein f is the current frame, wherein i is a positive integer less than or equal to N, wherein $x_{i,j}^f$ is a $j^{th}$ pixel value of the $i^{th}$ f minimum unit of the current frame, and wherein $\overline{x_i^f}$ indicates an average value of pixel values of the $i^{th}$ minimum unit of the current frame;

calculating the energy $E_{global}$ of the current frame according to the following formula:

$$E_{global} = \frac{1}{N} \sum_{i=1}^{N} \sqrt{\frac{2V_i^f}{k^2-1} + C};$$

and calculating the first energy $Ep_{local}$ of the current predict unit according to the following formula:

$$Ep_{local} = \frac{1}{L} \sum_{i=1}^{L} \sqrt{\frac{2V_i^f}{k^2-1} + C},$$

wherein $C = (\alpha*255)^2$, $\alpha \in (0,1)$.

3. The method of claim 1, wherein determining the current predict unit comprises:

calculating a Lagrange multiplier of each candidate predict unit in Y candidate predict units, wherein Y is an integer greater than or equal to 2;

determining, using a Lagrange multiplier of an $x^{th}$ candidate predict unit in the Y candidate predict units, parameter information of the $x^{th}$ candidate predict unit according to the rate-distortion optimization algorithm, wherein x needs to be any integer greater than or equal to 1 and less than or equal to Y in [1, Y], and wherein parameter information of the current predict unit is motion vector information of the $x^{th}$ candidate predict unit during inter-frame prediction or prediction direction information of the $x^{th}$ candidate predict unit during intra-frame prediction;

determining, using the rate-distortion optimization algorithm, a candidate predict unit from the Y candidate predict units as a target candidate predict unit according to motion vector information of each candidate predict unit in the Y candidate predict units during the inter-frame prediction or according to prediction direction information of each candidate predict unit in the Y candidate predict units during the intra-frame prediction; and dividing, using the target candidate predict unit, the current coding unit to obtain the current predict unit.

4. The method of claim 3, wherein performing, using the Lagrange multiplier $LambdaP_{new}$ of the current predict unit, the encoding processing on the current predict unit according to the rate-distortion optimization algorithm to obtain the encoding result of the current predict unit comprises:

determining a prediction signal of the current predict unit according to a size of the current predict unit and prediction direction information of the current predict unit during the intra-frame prediction and according to an intra-frame prediction mechanism; and performing, after a residual operation based on the prediction signal of the current predict unit, entropy encoding on the current predict unit to obtain the encoding result of the current predict unit.

5. The method of claim 4, wherein performing, after the residual operation based on the prediction signal of the current predict unit, the entropy encoding on the current predict unit to obtain the encoding result of the current predict unit comprises:

obtaining a residual of the current predict unit according to a received difference between a video signal of the current predict unit and the prediction signal of the current predict unit, wherein the video signal of the current predict unit is located in the video data;

performing discrete cosine transform (DCT) processing on the residual of the current predict unit to obtain a DCT transform coefficient of the current predict unit;

performing quantization processing on the DCT transform coefficient according to a quantization parameter $Qp_{new}$ of the current predict unit to obtain a quantization processed DCT transform coefficient; and performing entropy encoding processing on a size of the current coding unit, a manner of dividing the current coding unit using the target candidate predict unit, the parameter information of the current predict unit, and the quantization processed DCT transform coefficient to obtain the encoding result of the current predict unit.

6. The method of claim 5, wherein performing quantization processing on the DCT transform coefficient according to the quantization parameter $Qp_{new}$ of the current predict unit comprises:

determining second energy $Ep'_{local}$ of the current predict unit according to the prediction signal of the current predict unit;

determining, according to a reconstructed signal of an encoded reconstructed frame, energy $E'_{global}$ of the encoded reconstructed frame;

determining a second scale factor Fp" of the current predict unit according to a ratio of the second energy $Ep'_{local}$ of the current predict unit to the energy $E'_{global}$ of the encoded reconstructed frame;

determining the quantization parameter $Qp_{new}$ according to the following formula: $Qp_{new}=Qp+6\times\log_2 Fp"$, wherein Fp" is the second scale factor, and wherein Qp is an original quantization parameter; and performing the quantization processing on the DCT transform coefficient according to the quantization parameter.

7. The method of claim 6, wherein determining the second energy $Ep'_{local}$ of the current predict unit according to the prediction signal of the current predict unit comprises:

calculating a second variance $V"_{i_f}$ of an $i^{th}$ minimum unit of the current predict unit of the current frame according to the following formula:

$$V_i''^f = \sum_{j=1}^{k^2} \left(x_{i,j}''^f - \overline{x_i''}^f\right)^2,$$

wherein f is the current frame, wherein $x''_{i,j}{}^f$ is a $j^{th}$ pixel value of the $i^{th}$ minimum unit of the current predict unit of the current frame, and wherein $\overline{x_i''}^f$ indicates an average value of pixel values of the $i^{th}$ minimum unit of the current predict unit of the current frame; and determining the second energy $Ep'_{local}$ of the current predict unit according to the following formula:

$$Ep'_{local} = \frac{1}{L}\sum_{i=1}^{L} \sqrt{\frac{2V_i''^f}{k^2-1} + C};$$

wherein $C=(\alpha*255)^2$, $\alpha \in (0,1)$.

8. The method of claim 6, wherein the reconstructed frame comprises N' minimum units, wherein N' is a positive integer greater than 1, and wherein determining, according to the reconstructed signal of the encoded reconstructed frame, the energy $E'_{global}$ of the reconstructed frame comprises:

calculation a variance $V'_i{}^{f'}$ of an $i^{th}$ minimum unit of the reconstructed frame according to the following formula:

$$V_i'^{f'} = \sum_{j=1}^{k^2} \left(x_{i,j}'^{f'} - \overline{x_i}^{f'}\right)^2,$$

wherein f' is the reconstructed frame, wherein $x'_{i,j}{}^{f'}$ is a $j^{th}$ pixel value of the $i^{th}$ minimum unit of the reconstructed frame, and wherein $\overline{x_i}^{f'}$ indicates an average value of pixel values of the $i^{th}$ minimum unit of the reconstructed frame; and determining the energy $E'_{global}$ of the reconstructed frame according to the following formula:

$$E'_{global} = \frac{1}{N'}\sum_{i=1}^{N'} \sqrt{\frac{2V_i'^{f'}}{k^2-1} + C},$$

wherein $C=(\alpha*255)^2$, $\alpha \in (0,1)$.

9. The method of claim 3, wherein performing, using the Lagrange multiplier $LambdaP_{new}$ of the current predict unit, the encoding processing on the current predict unit according to the rate-distortion optimization algorithm to obtain the encoding result of the current predict unit comprises:

determining a prediction signal of the current predict unit according to a size of the current predict unit and motion vector information of the current predict unit during the inter-frame prediction and according to an inter-frame prediction mechanism; and performing, after a residual operation based on the prediction signal of the current predict unit, entropy encoding on the current predict unit to obtain the encoding result of the current predict unit.

10. An encoding device, comprising:

an input/output interface configured to receive video data, wherein the video data is divided into multiple frames, wherein each of the frames is divided into multiple coding units, and wherein each of the coding units is divided into at least two predict units;

a memory coupled to the input/output interface and comprising instructions;

a processor coupled to the memory and to the input/output interface and configured to execute the instructions, wherein the instructions cause the processor to be configured to:

calculate a Lagrange multiplier $LambdaP_{new}$ of a current predict unit in a current coding unit, by:

determining the current predict unit;

calculating an energy $E_{global}$ of the current frame; and calculating a first energy $Ep_{local}$ of the current predict unit;

determining a first scale factor Fp of the current predict unit according to a ratio of the first energy $Ep_{local}$ to the energy $E_{global}$, wherein the first scale factor Fp is in a range from 0 to 2; and performing, using the first scale factor Fp, scaling processing on a Lagrange multiplier Lambda to obtain the Lagrange multiplier $LambdaP_{new}$ of the current predict unit, wherein the current predict unit is a segment of video signal within the current coding unit, the current coding unit is located in a current frame that is one of the frames;

perform, using the Lagrange multiplier $LambdaP_{new}$ of the current predict unit, encoding processing on the current predict unit according to a rate-distortion optimization algorithm to obtain an encoding result of the current predict unit; and send the encoding result of the current predict unit to a decoder side.

11. The encoding device of claim 10, wherein the instructions further cause the processor to be configured to:

determine a minimum unit of k*k pixels, wherein the current frame comprises N minimum units, wherein the current predict unit comprises L minimum units, wherein k, N and L are all integers greater than 1, and N>L;

calculate a first variance $V_i{}^f$ of an $i^{th}$ minimum unit of the current frame according to the following formula:

$$V_i^f = \sum_{j=1}^{k^2} \left(x_{i,j}^f - \overline{x_i}^f\right)^2,$$

wherein f is the current frame, wherein i is a positive integer less than or equal to N, wherein $x_{i,j}{}^f$ is a $j^{th}$ pixel value of the $i^{th}$ minimum unit of the current frame, and wherein $\overline{x_i}^f$ indicates an average value of pixel values of the $i^{th}$ minimum unit of the current frame;

calculate the energy $E_{global}$ of the current frame according to the following formula:

$$E_{global} = \frac{1}{N}\sum_{i=1}^{N} \sqrt{\frac{2V_i^f}{k^2-1} + C};$$

and calculate the first energy $Ep_{local}$ of the current predict unit according to the following formula:

$$Ep_{local} = \frac{1}{L}\sum_{i=1}^{L}\sqrt{\frac{2V_i^f}{k^2-1}} + C,$$

wherein $C=(\alpha*255)^2$, $\alpha \in (0,1)$.

12. The encoding device of claim 10, wherein the instructions further cause the processor to be configured to:
   calculate a Lagrange multiplier of each candidate predict unit in Y candidate predict units, wherein Y is an integer greater than or equal to 2;
   determine, using a Lagrange multiplier of an $x^{th}$ candidate predict unit in the Y candidate predict units, parameter information of the $x^{th}$ candidate predict unit according to the rate-distortion optimization algorithm, wherein x needs to be any integer greater than or equal to 1 and less than or equal to Y in [1, Y], and wherein parameter information of the current predict unit is motion vector information of the $x^{th}$ candidate predict unit during inter-frame prediction;
   determine, using the rate-distortion optimization algorithm, a candidate predict unit from the Y candidate predict units as a target candidate predict unit according to motion vector information of each candidate predict unit in the Y candidate predict units during the inter-frame prediction; and
   divide, using the target candidate predict unit, the current coding unit to obtain the current predict unit.

13. The encoding device of claim 12, wherein the instructions further cause the processor to be configured to:
   either determine a prediction signal of the current predict unit according to a size of the current predict unit and motion vector information of the current predict unit during the inter-frame prediction and according to an inter-frame prediction mechanism; or
   determine a prediction signal of the current predict unit according to a size of the current predict unit and prediction direction information of the current predict unit during the intra-frame prediction and according to an intra-frame prediction mechanism; and
   perform, after a residual operation based on the prediction signal of the current predict unit, entropy encoding on the current predict unit to obtain the encoding result of the current predict unit.

14. The encoding device of claim 13, wherein the instructions further cause the processor to be configured to:
   obtain a residual of the current predict unit according to a received difference between a video signal of the current predict unit and the prediction signal of the current predict unit, wherein the video signal of the current predict unit is located in the video data;
   perform discrete cosine transform (DCT) processing on the residual of the current predict unit to obtain a DCT transform coefficient of the current predict unit;
   perform quantization processing on the DCT transform coefficient according to a quantization parameter $Qp_{new}$ of the current predict unit to obtain a quantization processed DCT transform coefficient; and
   perform entropy encoding processing on a size of the current coding unit, a manner of dividing the current coding unit using the target candidate predict unit, the parameter information of the current predict unit, and the quantization processed DCT transform coefficient, to obtain the encoding result of the current predict unit.

15. The encoding device of claim 14, wherein the instructions further cause the processor to be configured to:
   determine second energy $Ep'_{local}$ of the current predict unit according to the prediction signal of the current predict unit;
   determine, according to a reconstructed signal of a reconstructed frame, energy $E'_{global}$ of the reconstructed frame;
   determine a second scale factor $Fp''$ of the current predict unit according to a ratio of the second energy $E'_{global}$ of the current predict unit to the energy $E'_{global}$ of the reconstructed frame;
   determine the quantization parameter $Qp_{new}$ according to the following formula:
   $Qp_{new}=Qp+6\times\log_2 Fp''$, wherein $Fp''$ is the second scale factor, and wherein $Qp$ is an original quantization parameter; and
   perform the quantization processing on the DCT transform coefficient according to the quantization parameter $Qp_{new}$.

16. The encoding device of claim 15, wherein the instructions further cause the processor to be configured to:
   calculate a second variance $V''^f_i$ of an $i^{th}$ minimum unit of the current predict unit of the current frame according to the following formula:

$$V_i''^f = \sum_{j=1}^{k^2}\left(x_{i,j}''^f - \overline{x}_i''^f\right)^2,$$

wherein f is the current frame, wherein $x''^f_{i,j}$ is a $j^{th}$ pixel value of the $i^{th}$ minimum unit of the current predict unit of the current frame, and wherein $\overline{x}''^f_i$ indicates an average value of pixel values of the $i^{th}$ minimum unit of the current predict unit of the current frame; and
   determine the second energy $Ep'_{local}$ of the current predict unit according to the following formula:

$$Ep'_{local} = \frac{1}{L}\sum_{i=1}^{L}\sqrt{\frac{2V_i''^f}{k^2-1}} + C;$$

wherein $C=(\alpha*255)^2$, $\alpha \in (0,1)$.

17. The encoding device of claim 16, wherein the reconstructed frame comprises N' minimum units, wherein N' is a positive integer greater than 1, and wherein the instructions further cause the processor to be configured to:
   calculate a variance $V'^{f'}_i$ of an $i^{th}$ minimum unit of the reconstructed frame according to the following formula:

$$V_i'^{f'} = \sum_{j=1}^{k^2}\left(x_{i,j}'^{f'} - \overline{x}_i'^{f'}\right)^2,$$

wherein f' is the reconstructed frame, wherein $x'^{f'}_{i,j}$ is a $i^{th}$ pixel value of the $i^{th}$ minimum unit of the reconstructed frame, and wherein $\overline{x}'^{f'}_i$ indicates an average value of pixel values of the $i^{th}$ minimum unit of the reconstructed frame; and determine the energy $E'_{global}$ of the reconstructed frame according to the following formula:

$$E'_{global} = \frac{1}{N'} \sum_{i=1}^{N'} \sqrt{\frac{2V_i^{f'}}{k^2-1} + C},$$

wherein $C=(\alpha*255)^2$, $\alpha \in (0,1)$.

18. The encoding device of claim 10, wherein the instructions further cause the processor to be configured to:
   calculate a Lagrange multiplier of each candidate predict unit in Y candidate predict units, wherein Y is an integer greater than or equal to 2;
   determine, using a Lagrange multiplier of an $x^{th}$ candidate predict unit in the Y candidate predict units, parameter information of the $x^{th}$ candidate predict unit according to the rate-distortion optimization algorithm, wherein x needs to be any integer greater than or equal to 1 and less than or equal to Y in [1, Y], and wherein parameter information of the current predict unit is prediction direction information of the $x^{th}$ candidate predict unit during intra-frame prediction;
   determine, using the rate-distortion optimization algorithm, a candidate predict unit from the Y candidate predict units as a target candidate predict unit according to prediction direction information of each candidate predict unit in the Y candidate predict units during the intra-frame prediction; and
   divide, using the target candidate predict unit, the current coding unit to obtain the current predict unit.

19. A non-transitory computer readable storage medium comprising instructions that when executed by a processor cause the processor to:
   receive video data comprising multiple frames, wherein each of the frames is divided into multiple coding units, and wherein each of the coding units is divided into at least two predict units;
   calculate a Lagrange multiplier LambdaP$_{new}$ of a current predict unit in a current coding unit, comprising:
      determining the current predict unit;
      calculating an energy $E_{global}$ of the current frame; and
      calculating a first energy $Ep_{local}$ of the current predict unit;
      determining a first scale factor Fp of the current predict unit according to a ratio of the first energy $Ep_{local}$ to the energy $E_{global}$, wherein the first scale factor Fp is in a range from 0 to 2; and
      performing, using the first scale factor Fp, scaling processing on a Lagrange multiplier Lambda to obtain the Lagrange multiplier LambdaP$_{new}$ of the current predict unit, wherein the current predict unit is a segment of video signal within the current coding unit, and wherein the current coding unit is located in the current frame that is one of the frames;
   perform, using the Lagrange multiplier LambdaP$_{new}$ of the current predict unit, encoding processing on the current predict unit according to a rate-distortion optimization algorithm to obtain an encoding result of the current predict unit; and
   send the encoding result of the current predict unit to a decoder side.

20. The non-transitory computer readable storage medium of claim 19, wherein the instructions further cause the processor to:
   determine a minimum unit of k*k pixels, wherein the current frame comprises N minimum units, and the current predict unit comprises L minimum units, wherein k, N and L are all integers greater than 1, and N>L;
   calculate a first variance $V_i^f$ of an $i^{th}$ minimum unit of the current frame according to the following formula:

$$V_i^f = \sum_{j=1}^{k^2} (x_{i,j}^f - \overline{x_i}^f)^2,$$

wherein f is the current frame, wherein i is a positive integer less than or equal to N, wherein $x_{i,j}^f$ is a $j^{th}$ pixel value of the $i^{th}$ minimum unit of the current frame, and wherein $\overline{x_i}^f$ indicates an average value of pixel values of the $i^{th}$ minimum unit of the current frame;
   calculate the energy $E_{global}$ of the current frame according to the following formula:

$$E_{global} = \frac{1}{N} \sum_{i=1}^{N} \sqrt{\frac{2V_i^f}{k^2-1} + C};$$

and
   calculate the first energy $Ep_{local}$ of the current predict unit according to the following formula:

$$Ep_{local} = \frac{1}{L} \sum_{i=1}^{L} \sqrt{\frac{2V_i^f}{k^2-1} + C},$$

wherein $C=(\alpha*255)^2$, $\alpha \in (0,1)$.

21. The non-transitory computer readable storage medium of claim 19, wherein the instructions further cause the processor to:
   calculate a Lagrange multiplier of each candidate predict unit in Y candidate predict units, wherein Y is an integer greater than or equal to 2;
   determine, using a Lagrange multiplier of an $x^{th}$ candidate predict unit in the Y candidate predict units, parameter information of the $x^{th}$ candidate predict unit according to the rate-distortion optimization algorithm, wherein x needs to be any integer greater than or equal to 1 and less than or equal to Y in [1, Y], and wherein parameter information of the current predict unit is motion vector information of the $x^{th}$ candidate predict unit during inter-frame prediction or prediction direction information of the $x^{th}$ candidate predict unit during intra-frame prediction;
   determine, using the rate-distortion optimization algorithm, a candidate predict unit from the Y candidate predict units as a target candidate predict unit according to motion vector information of each candidate predict unit in the Y candidate predict units during the inter-frame prediction or according to prediction direction information of each candidate predict unit in the Y candidate predict units during the intra-frame prediction; and
   divide, using the target candidate predict unit, the current coding unit to obtain the current predict unit.

22. The non-transitory computer readable storage medium of claim 21, wherein the instructions further cause the processor to:
- determine a prediction signal of the current predict unit according to a size of the current predict unit and motion vector information of the current predict unit during the inter-frame prediction and according to an inter-frame prediction mechanism; and
- perform, after a residual operation based on the prediction signal of the current predict unit, entropy encoding on the current predict unit to obtain the encoding result of the current predict unit.

23. The non-transitory computer readable storage medium of claim 22, wherein the instructions further cause the processor to:
- obtain a residual of the current predict unit according to a received difference between a video signal of the current predict unit and the prediction signal of the current predict unit, wherein the video signal of the current predict unit is located in the video data;
- perform discrete cosine transform (DCT) processing on the residual of the current predict unit to obtain a DCT transform coefficient of the current predict unit;
- perform quantization processing on the DCT transform coefficient according to a quantization parameter $Qp_{new}$ of the current predict unit to obtain a quantization processed DCT transform coefficient; and
- perform entropy encoding processing on a size of the current coding unit, a manner of dividing the current coding unit using the target candidate predict unit, the parameter information of the current predict unit, and the quantization processed DCT transform coefficient to obtain the encoding result of the current predict unit.

24. The non-transitory computer readable storage medium of claim 23, wherein the instructions further cause the processor to:
- determine second energy $Ep'_{local}$ of the current predict unit according to the prediction signal of the current predict unit;
- determine, according to a reconstructed signal of an encoded reconstructed frame, energy $E'_{global}$ of the encoded reconstructed frame;
- determine a second scale factor $Fp''$ of the current predict unit according to a ratio of the second energy $E'_{global}$ of the current predict unit to the energy $E'_{global}$ of the encoded reconstructed frame;
- determine the quantization parameter $Qp_{new}$ according to the following formula: $Qp_{new} = Qp + 6 \times \log_2 Fp''$, wherein $Fp''$ is the second scale factor, and wherein $Qp$ is an original quantization parameter; and
- perform the quantization processing on the DCT transform coefficient according to the quantization parameter.

25. The non-transitory computer readable storage medium of claim 24, wherein the instructions further cause the processor to:
- calculate a second variance $V''^f_i$ of an $i^{th}$ minimum unit of the current predict unit of the current frame according to the following formula $$V''^f_i = \sum_{j=1}^{k^2} \left(x''^f_{i,j} - \overline{x}^{''f}_i\right)^2,$$

wherein f is the current frame, wherein $x''^f_{i,j}$ is a $j^{th}$ pixel value of the $i^{th}$ minimum unit of the current predict unit of the current frame, and wherein $\overline{x}^{''f}_i$ indicates an average value of pixel values of the $i^{th}$ minimum unit of the current predict unit of the current frame; and

- determine the second energy $Ep'_{local}$ of the current predict unit according to the following formula:

$$Ep'_{local} = \frac{1}{L}\sum_{i=1}^{L} \sqrt{\frac{2V''^f_i}{k^2-1} + C},$$

wherein $C = (\alpha * 255)^2$, $\alpha \in (0,1)$.

26. The non-transitory computer readable storage medium of claim 25, wherein the reconstructed frame comprises N' minimum units, wherein N' is a positive integer greater than 1, and wherein the instructions further cause the processor to:
- calculate a variance $V'^{f'}_i$ of an $i^{th}$ minimum unit of the reconstructed frame according to the following formula:

$$V'^{f'}_i = \sum_{j=1}^{k^2} \left(x'^{f'}_{i,j} - \overline{x}^{'f'}_i\right)^2,$$

wherein f' is the reconstructed frame, wherein $x'^{f'}_{i,j}$ is a $j^{th}$ pixel value of the $i^{th}$ minimum unit of the reconstructed frame, and wherein $\overline{x}^{'f'}_i$ indicates an average value of pixel values of the $i^{th}$ minimum unit of the reconstructed frame; and
- determine the energy $E'_{global}$ of the reconstructed frame according to the following formula:

$$E'_{global} = \frac{1}{N'}\sum_{i=1}^{N'} \sqrt{\frac{2V'^{f'}_i}{k^2-1} + C},$$

wherein $C = (\alpha * 255)^2$, $\alpha \in (0,1)$.

27. The non-transitory computer readable storage medium of claim 21, wherein the instructions further cause the processor to:
- determine a prediction signal of the current predict unit according to a size of the current predict unit and prediction direction information of the current predict unit during the intra-frame prediction and according to an intra-frame prediction mechanism; and
- perform, after a residual operation based on the prediction signal of the current predict unit, entropy encoding on the current predict unit to obtain the encoding result of the current predict unit.

* * * * *

UNITED STATES PATENT AND TRADEMARK OFFICE
CERTIFICATE OF CORRECTION

PATENT NO. : 10,645,382 B2
APPLICATION NO. : 15/486475
DATED : May 5, 2020
INVENTOR(S) : Xiang Zhang, Siwei Ma and Zhuoyi Lv It is certified that error appears in the above-identified patent and that said Letters Patent is hereby corrected as shown below:

In the Claims

Claim 2, Column 41, Line 21: "$i^{th}$ f minimum" should read "$i^{th}$ minimum"

Claim 7, Column 42, Line 65: "variance V"$i_f$ of an" should read "variance V"$^f_i$ of an"

Claim 17, Column 46, Line 63: "is a $i^{th}$" should read "is a $j^{th}$"

Signed and Sealed this
Twenty-third Day of June, 2020

Andrei Iancu
*Director of the United States Patent and Trademark Office*